(12) United States Patent
Daub et al.

(10) Patent No.: US 9,182,041 B2
(45) Date of Patent: Nov. 10, 2015

(54) SEAL FOR SEALING A SEALING GAP AND METHOD FOR PRODUCING A SEAL OF THIS TYPE

(75) Inventors: Oliver Daub, Remseck (DE); Günther Grau, Bietigheim-Bissingen (DE); Klaus Hocker, Ilsfeld (DE); Adam Konik, Sachsenheim (DE); Werner Neuschwander, Güglingen (DE); Fabian Kopp, Tamm (DE); Walter Schuhmacher, Bietigheim-Bissingen (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 13/585,457

(22) Filed: Aug. 14, 2012

(65) Prior Publication Data

US 2013/0043660 A1    Feb. 21, 2013

(30) Foreign Application Priority Data

Aug. 15, 2011    (DE) .......................... 10 2011 080 970

(51) Int. Cl.
*F16J 15/32*    (2006.01)

(52) U.S. Cl.
CPC .......... *F16J 15/3236* (2013.01); *F16J 15/3212* (2013.01); *Y10T 29/4998* (2015.01)

(58) Field of Classification Search
CPC ............... F16J 9/00; F16J 9/062; F16J 9/065; F16J 9/066; F16J 9/067; F16J 9/068; F16J 15/3204; F16J 15/3208; F16J 15/3212; F16J 15/3236

USPC ................ 277/567, 647, 555, 472, 482, 484; 267/157, 161, 164

See application file for complete search history.

(56) References Cited

U.S. PATENT DOCUMENTS

| 1,621,272 | A |   | 3/1927 | Raymond |
|---|---|---|---|---|
| 1,929,009 | A | * | 10/1933 | Williams ...................... 403/138 |
| 1,938,249 | A | * | 12/1933 | Fretter .......................... 277/555 |
| 2,088,703 | A | * | 8/1937 | Hubbard et al. ............... 277/555 |
| 2,285,961 | A | * | 6/1942 | Finley ........................... 277/484 |

(Continued)

FOREIGN PATENT DOCUMENTS

| CN | 2668940 | 1/2005 |
|---|---|---|
| DE | 21 11 312 | 9/1972 |

(Continued)

OTHER PUBLICATIONS

PTFE-Dichtungen/Seals, Parker-Prädifa GmbH, 1992.

*Primary Examiner* — Vishal Patel
*Assistant Examiner* — L. Susmitha Koneru
(74) *Attorney, Agent, or Firm* — Womble Carlyle Sandridge & Rice, LLP

(57) ABSTRACT

In order to provide a seal for sealing a sealing gap between a first component and a second component, comprising a seal body with at least one sealing portion and at least one spring element for biasing the sealing portion against at least one of the components to be sealed, the spring element being at least partially arranged in a receiving space of the seal body, which seal is simply constructed and easily producible and nevertheless ensures a secure retention of the spring element in the receiving space, it is proposed that the spring element has at least one claw element, by means of which the spring element is interlocked with the seal body.

22 Claims, 17 Drawing Sheets

(56) References Cited

U.S. PATENT DOCUMENTS

| | | | | |
|---|---|---|---|---|
| 2,342,458 | A * | 2/1944 | Davies | 277/530 |
| 2,833,604 | A * | 5/1958 | Hunt | 277/478 |
| 3,055,669 | A * | 9/1962 | Knoebel | 277/478 |
| 3,191,947 | A * | 6/1965 | Hamm | 277/477 |
| 3,355,180 | A * | 11/1967 | Hamm | 277/481 |
| 3,612,545 | A * | 10/1971 | Storms | 277/582 |
| 3,628,800 | A * | 12/1971 | Prasse | 277/463 |
| 3,837,631 | A | 9/1974 | Evans et al. | |
| 3,903,584 | A | 9/1975 | Evans et al. | |
| 4,183,544 | A * | 1/1980 | Morsbach et al. | 277/481 |
| 4,193,605 | A * | 3/1980 | Josephson | 277/642 |
| 4,226,430 | A * | 10/1980 | Nisper | 277/477 |
| 4,508,356 | A * | 4/1985 | Janian | 277/555 |
| 4,579,351 | A * | 4/1986 | Daffron | 277/481 |
| 4,658,847 | A * | 4/1987 | McCrone | 137/72 |
| 5,165,125 | A * | 11/1992 | Callaway | 5/247 |
| 5,799,953 | A * | 9/1998 | Henderson | 277/554 |
| 5,890,719 | A * | 4/1999 | Bettencourt | 277/599 |
| 6,161,834 | A * | 12/2000 | Pollack et al. | 277/300 |
| 6,349,943 | B1 * | 2/2002 | Ishii et al. | 277/448 |
| 6,443,459 | B2 * | 9/2002 | Lebeau et al. | 277/372 |
| 6,531,559 | B1 | 3/2003 | Smith et al. | |
| 7,070,187 | B2 * | 7/2006 | Boeve | 277/598 |
| 7,240,904 | B2 * | 7/2007 | Droscher et al. | 277/349 |
| 7,243,596 | B2 * | 7/2007 | Usui et al. | 92/253 |
| 7,475,873 | B2 * | 1/2009 | Rode | 267/161 |
| 7,677,806 | B2 * | 3/2010 | Moehring | 384/243 |
| 7,740,248 | B2 * | 6/2010 | Keene et al. | 277/603 |
| 7,942,423 | B2 | 5/2011 | Kondo et al. | |
| 7,959,159 | B2 * | 6/2011 | Hocker et al. | 277/559 |
| 8,016,297 | B2 * | 9/2011 | Heinemann et al. | 277/644 |
| 8,251,373 | B2 * | 8/2012 | Lev et al. | 277/647 |
| 2004/0131475 | A1 * | 7/2004 | Yokomachi et al. | 417/269 |
| 2005/0242571 | A1 * | 11/2005 | Houghton et al. | 285/110 |
| 2007/0108680 | A1 * | 5/2007 | Janian | 267/164 |
| 2007/0145655 | A1 * | 6/2007 | Rode | 267/161 |
| 2009/0166982 | A1 * | 7/2009 | Kondo et al. | 277/549 |
| 2011/0312228 | A1 * | 12/2011 | Schrader | 439/733.1 |
| 2013/0038028 | A1 * | 2/2013 | Jack et al. | 277/638 |
| 2013/0161553 | A1 * | 6/2013 | Hunter | 251/366 |

FOREIGN PATENT DOCUMENTS

| | | |
|---|---|---|
| EP | 1 263 877 | 6/2007 |
| GB | 589768 | 6/1974 |
| JP | 11-108193 | 4/1999 |
| JP | 2008-223936 | 9/2008 |
| JP | 2009-216168 | 9/2009 |

* cited by examiner

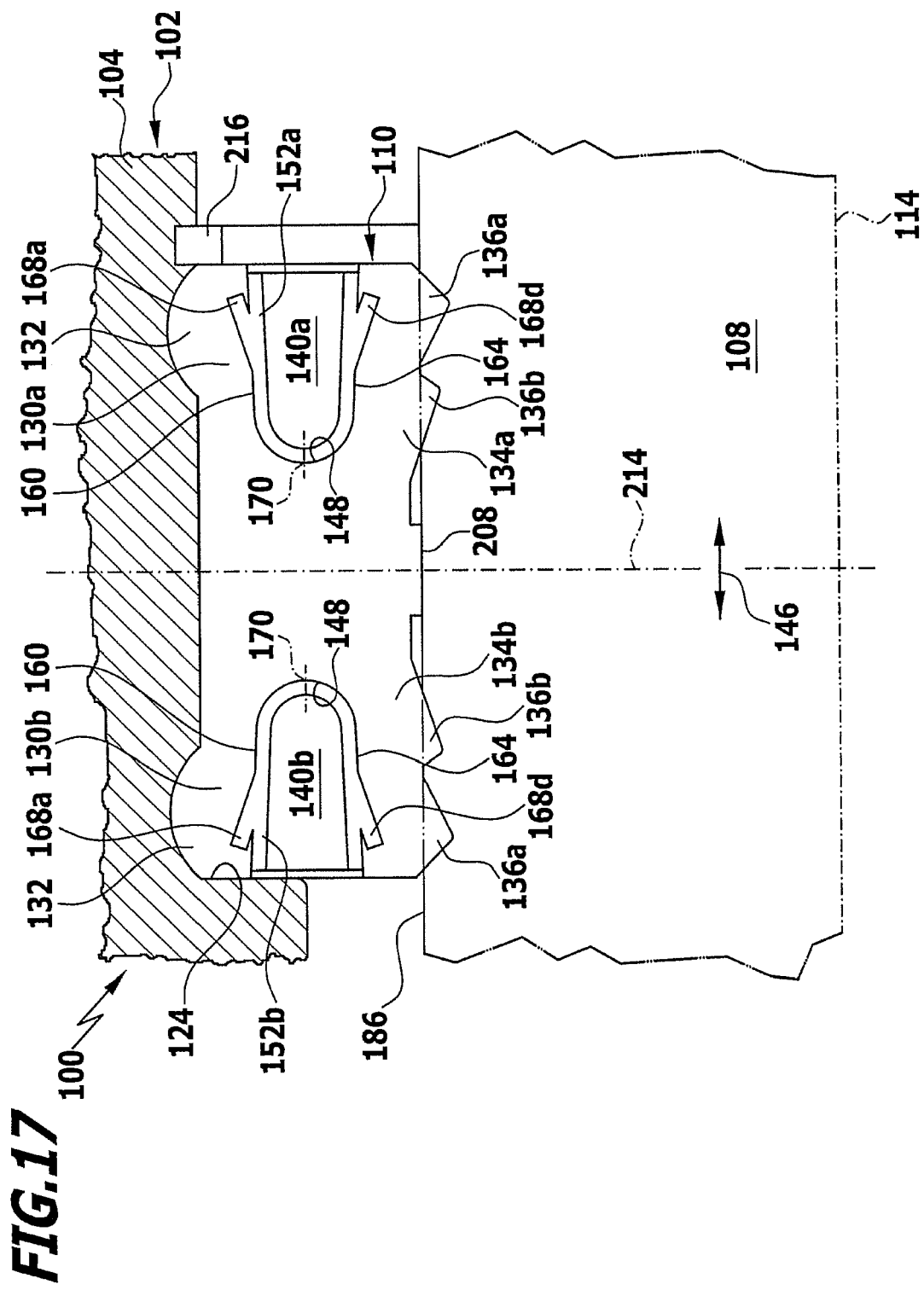

SEAL FOR SEALING A SEALING GAP AND METHOD FOR PRODUCING A SEAL OF THIS TYPE

CROSS-REFERENCE TO RELATED APPLICATION

The present disclosure relates to the subject matter of, and claims priority to, German Application No. 10 2011 080 970.8, filed on Aug. 15, 2011, the entire specification of which is incorporated herein by reference.

FIELD OF THE INVENTION

The present invention relates to a seal for sealing a sealing gap between a first component and a second component, the seal comprising a seal body with at least one sealing portion and at least one spring element for biasing the sealing portion against one of the components to be sealed, the spring element being at least partially, preferably substantially completely, arranged in a receiving space of the seal body.

BACKGROUND OF THE INVENTION

Seals of this type are known from the prior art. In particular, seals of this type are marketed by the company ElringKlinger Kunststofftechnik GmbH, 74321 Bietigheim-Bissingen, Germany, under the name "spring-assisted lip seal".

In order to secure the spring element against it moving out of the receiving space unintentionally, provided on the seal body of these known seals is a so-called retaining lug, past which the spring element is moved when the spring element is introduced into the receiving space and which forms an undercut, behind which the spring element latches in, so that the spring element is retained by the retaining lug in the receiving space.

However, to produce the retaining lug, an additional turning work step is necessary, for which a separate turning tool is required. As this turning tool is relatively delicate, it wears very rapidly, in particular owing to fillers contained in the material of the seal body. The wear of the turning tool leads to the retaining lug no longer being perfectly turned. As a result, undesired pieces of fluff may occur, which can detach from the seal body during use of the seal and lead to problems in the tightness of the seal and to problems in the assembly containing the seal (for example to a clogging of nozzles or filters).

The turning tool therefore has to be changed relatively often.

SUMMARY OF THE INVENTION

The present invention is based on the object of providing a seal of the type mentioned at the outset, which is simply constructed and easily producible and nevertheless ensures a secure retention of the spring element in the receiving space.

This object is achieved according to the invention with a seal having the features of the preamble of claim 1 in that the spring element has at least one claw element, by means of which the spring element is interlocked with the seal body.

The present invention is therefore based on the idea of configuring the spring element itself in such a way that it positively and/or non-positively interlocks with the seal body in such a way that the spring element can no longer be unintentionally detached from the receiving space of the seal body.

It is therefore no longer necessary in the seal according to the invention to provide the seal body with a retaining nose.

As a result the otherwise necessary laborious CNC machining of the seal body including the high tool wear and the high cost outlay are dispensed with for the production of the retaining lug. Furthermore, the risk of the formation of undesired pieces of fluff on the retaining lug is dispensed with.

The spring element of the seal according to the invention secures itself on the seal body.

Basically, any suitable material, which is stable under the use conditions of the seal, is a possibility for the production of the seal body.

In particular, the seal body may comprise a plastics material and may preferably be substantially completely produced from a plastic material.

Possible plastic materials are, in particular, fluoropolymer materials.

It is particularly favorable, in particular for use of the seal element in an aggressive environment, if the seal body comprises a polytetrafluoroethylene material and/or a polytetrafluoroethylene compound, and is preferably substantially completely formed from one of the materials mentioned.

A polytetrafluoroethylene compound is to be taken to mean here a mixture of a polytetrafluoroethylene material and one or more fillers.

The term polytetrafluoro ethylene (PTFE) also designates in this description and the accompanying claims, modified polytetrafluoroethylene materials, in which some of the fluorine atoms of the polytetrafluoroethylene are replaced by substituents.

Since the requirement for delicate turning tools to produce a retaining lug has been dispensed with, PTFE compounds, which are, in particular, highly filled (in other words having a high proportion of fillers) and which are difficult to machine, can be used for the seal body of the seal according to the invention, without drastically increasing the CNC tool costs required to produce the seal body.

Alternatively or in addition to this, it may also be provided that the seal body comprises a melt-processable TFE (tetrafluoroethylene) copolymer or a compound of a melt-processable TFE copolymer, and is preferably substantially completely formed from a melt-processable TFE copolymer of this type or from a compound of a melt-processable TFE copolymer of this type.

Suitable melt-processable TFE copolymers are, in particular, described in EP 1 263 877 B1.

A melt-processable TFE copolymer made of TFE and a fluorinated comonomer is preferably used in a proportion of less than 1 mol-%.

The comonomer is preferably selected from
hexafluoropropylene;
perfluoroalkyl vinyl ethers (in particular perfluoroethyl vinyl ether and perfluoropropyl vinyl ether);
perfluoro-(2,2-dimethyl-1,3-dioxole).

In a special configuration of the seal, the seal body is configured as an injection-molded part, preferably from a melt-processable TFE copolymer or a compound of a melt-processable TFE copolymer.

If the seal body has no retaining projection, in particular no retaining lug, to retain the spring element in the receiving space, the seal body is particularly easily producible as an injection-molded part, as the injection-molded seal body is then configured to be easily removed from the injection-molding tool.

The spring element preferably has one or more claw elements, which are arranged on spread out web members of the spring element.

Owing to the claw elements, the spring, which is interlocked with the seal body, automatically centers in the receiving space. The spring element therefore no longer moves relative to the boundary walls of the receiving space after its assembly on the seal body and is preferably positioned within the receiving space such that it exerts substantially the same biasing forces on mutually opposing sealing portions of the seal body, which abut different components to be sealed. As a result, particularly uniform contact pressures of sealing lips of the sealing portions can be achieved on the respective sealed components, thus achieving a particularly good fluid-tightness of the seal according to the invention.

Furthermore, the self-centering of the spring element in the receiving space of the seal body also means that the biasing force of the spring element on the sealing portions along the peripheral direction of the spring element is substantially constant. This also contributes to an evening out of the sealing lip contact pressures along the peripheral direction of the seal, which increases the fluid-tightness of the seal according to the invention and reduces the risk of leaks.

In contrast to this, in the case of spring-assisted lip seals, in which the spring element is only retained in the receiving space by a retaining lug, the back of the spring element can move in the groove base because of tolerance stack-up of the groove geometry in the seal body and the spring geometry, so the spring element rests more on an inner sealing portion or more on an outer sealing portion. This results in the fact that the spring element exerts different biasing forces on the mutually opposing sealing portions of the seal body, which results in different sealing forces on the components to be sealed.

Moreover, a spring element only retained in the receiving space of the seal body by a retaining lug is not automatically centered in the groove forming the receiving space, so different sealing lip contact pressures occur on the sealing portions of the seal body, which makes leaks possible.

These drawbacks are avoided or at least reduced by the seal according to the invention, in which the spring element is interlocked with the seal body.

Since the retaining lug on the seal body has been dispensed with, the danger no longer exists either of a retaining lug of this type being damaged during the assembly of the spring element on the seal body. Thus, no additional formation of pieces of fluff can occur either because of damage to a retaining lug. Furthermore, the danger also no longer exists of the spring element being displaced from the receiving space because of a defect on a retaining lug and thereby bringing about a failure of the seal.

In a preferred configuration of the invention, it is provided that the spring element comprises a base body which is meandering in shape.

At least one claw element may comprise at least one projection arranged on a base body of the spring element.

If the seal body is annular, at least one claw element is preferably arranged on a peripheral direction portion of a base body of the spring element, which extends substantially along the peripheral direction of the seal body.

The receiving space of the seal body may open at a mouth opening into an external space of the seal body. Owing to a mouth opening of this type, the spring element can be introduced at least partially into the receiving space of the seal body during the assembly of the seal.

Furthermore, the receiving space of the seal body may be closed by an end wall or a groove base at a side opposing the mouth opening.

The spring element preferably has at least two claw elements, which are arranged substantially at the same spacing from the mouth opening of the receiving space. As a result, a particularly precise self-centering of the spring element is achieved in relation to the receiving space.

As an alternative or in addition to this, it may be provided that the spring element has at least two claw elements, which are arranged at different spacings from the mouth opening of the receiving space. This achieves a particularly uniform distribution of the resilient biasing force exerted by the spring element on the seal body along a longitudinal direction or axial direction of the spring element, the seal body and/or the seal.

In a preferred configuration of the invention it is provided that the seal body comprises a first sealing portion, for example a radially outer sealing portion, for applying against the first component and a second sealing portion, for example a radially inner sealing portion, for applying against the second component, the spring element biasing the first sealing portion against the first component and the second sealing portion against the second component when the seal is in the assembled state.

In this case, it is advantageous if the spring element has at least one claw element, which is interlocked with the first sealing portion, and has at least one claw element, which is interlocked with the second sealing portion.

This achieves a particularly reliable securing of the spring element on the two sealing portions.

As an alternative or in addition to this, it may be provided that the spring element has at least two claw elements, which are interlocked with the same one of the two sealing portions.

The spring element preferably has at least one claw element, which is interlocked with the seal body on a boundary wall of the receiving space. This achieves a securing of the spring element on the seal body within the receiving space.

As an alternative or in addition to this, it may also be provided that the spring element has at least one claw element, which is interlocked with the seal body outside the receiving space. In this manner, a securing of the spring element to the seal body is achieved outside the receiving space.

A securing of the spring element to the seal body outside the receiving space may be achieved, in particular, in that the seal body has an end face arranged next to the receiving space, at least one claw element of the spring element being interlocked with the seal body at this end face.

In a preferred configuration of the seal according to the invention, it is provided that the seal body has no retaining projection, in particular no retaining lug, to retain the spring element in the receiving space.

The present invention furthermore relates to a method for producing a seal for sealing a sealing gap between a first component and a second component.

The present invention is based on the further object of providing a method of this type, which is easily implementable and produces a seal with a spring element, which is securely retained (at least partially) in a receiving space of a seal body of the seal.

This object is achieved according to the invention by a method for producing a seal for sealing a sealing gap between a first component and a second component, which comprises the following method steps:
  producing a seal body with at least one sealing portion and a receiving space;
  producing a spring element with at least one claw element;
  at least partially introducing the spring element into the receiving space of the seal body, the spring element being interlocked with the seal body by at least one claw element.

Particular configurations of the method according to the invention have already been described above in conjunction with the seal according to the invention.

The spring element of the seal according to the invention may have special, spread out interlocking web members.

The spring element can be simply pressed into a receiving space of a seal body, that preferably does not have a retaining lug, and interlocks by means of spreading out web members with the seal body, in particular within the receiving space of the seal body in such a way that the spring element can no longer detach from the seal body.

The receiving space of the seal body is preferably configured to be annular, in particular as an annular groove.

The spring element may be interlocked with the seal body on one side or on both sides.

The seal according to the invention is suitable, in particular, as a dynamic seal for sealing a sealing gap between two components, which are moveable relative to one another.

The relative movement between the first component and the second component may, in this case, comprise a linear movement and/or a rotary movement.

The seal according to the invention may, in particular, be used as a rod seal or piston seal or as a radial shaft sealing ring.

The spring element preferably comprises a resilient metallic material, preferably a spring steel material, and is, in particular, substantially completely formed from a resilient metallic material of this type.

Further features and advantages of the invention are the subject of the following description and the graphical view of embodiments.

BRIEF DESCRIPTION OF THE DRAWINGS

FIG. 17 shows a schematic radial cross-section through an eleventh embodiment of the seal, the seal being configured as a double seal with two first sealing portions, two second sealing portions and two spring elements interlocked with the seal body.

The same or functionally equivalent elements are designated by the same reference numerals in all the figures.

DETAILED DESCRIPTION OF THE INVENTION

Figure 1:
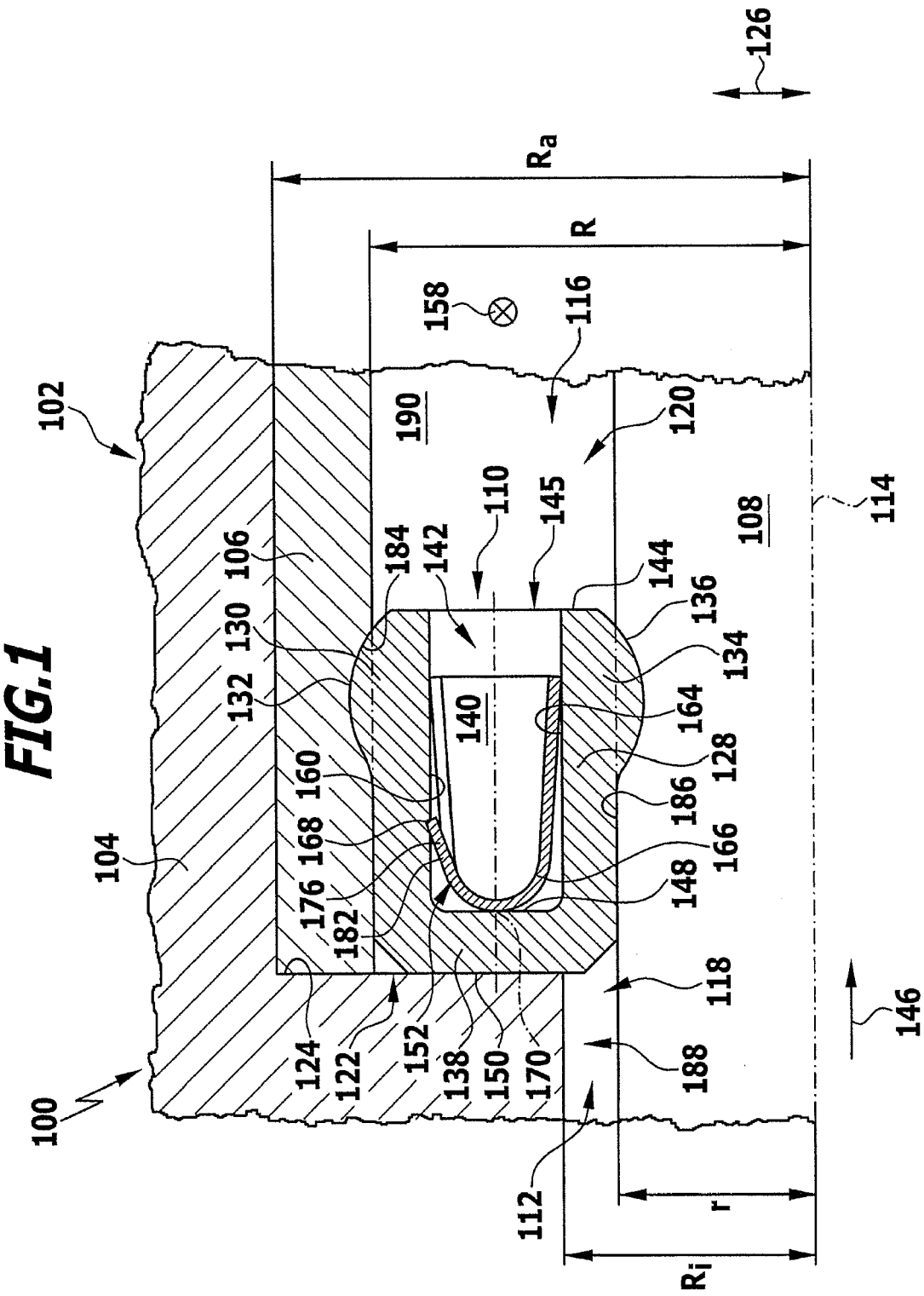
FIG. 1 shows a schematic section through an assembly with a first component, a second component and a seal for sealing a sealing gap between the first component and the second component.

An assembly 100 shown partially in FIG. 1 comprises an assembled first component 102, which comprises a base part 104 and a seal holder 106, a second component 108, which is, for example, annularly surrounded by the first component 102, and a seal 110 for sealing a sealing gap 112 between the first component 102 and the second component 108.

The seal holder 106 may also be configured in one piece with the base part 104 in this embodiment.

The second component 108 is substantially cylindrical, at least in portions, with a longitudinal axis 114 and an external radius r (see FIG. 1).

The base part 104 of the first component 102, annularly surrounding the second component 108, has a stepped through-channel 116, which has a narrower portion 118 with a radius $R_i$ and a further portion 120 with a radius $R_a$.

The narrower portion 118 and the further portion 120 meet one another at a step 122 with an annular end face 124 running in a radial direction 126 of the assembly 100.

The seal 110 is arranged in the further portion 120 of the through-channel 116.

It comprises an annular seal body 128 with a substantially U-shaped radial cross-section.

The seal body 128 comprises a first sealing portion 130, which forms a radially outer leg of the seal body 128 and, when the seal 110 is in the assembled state, abuts with a first sealing lip 132 in a sealing manner on the first component 102, in particular on the seal holder 106; a second sealing portion 134, which forms a radially inner leg of the seal body 128 and, when the seal 110 is in the assembled state, abuts with a second sealing lip 136 on the second component 108; and an annular web 138, which connects one end of the first sealing portion 130 to one end of the second sealing portion 134.

The two sealing portions 130 and 134 of the seal body 128 are separated from one another by a receiving space 140, in particular in the form of an annular groove 142, which extends proceeding from a mouth opening 145 on an open end face 144 of the seal body 128 along an axial direction 146 of the assembly 100 and the seal 110 into the seal body 128 and ends at a groove base 148, which extends substantially in the radial direction 126 and is spaced apart in the axial direction 146 from a closed end face 150 of the seal body 128 also extending substantially in the radial direction 126.

The seal body 128 is preferably produced in one piece from a suitable plastics material.

A fluoropolymer material, for example PTFE or a PTFE compound, in particular also modified PTFE or a modified PTFE compound is possible, in particular, as a suitable plastics material.

The substantially rotationally symmetrical seal body 128 may, in particular, be produced from a substantially cylindrical base body by machining on a turning machine.

As an alternative to this, the seal body 128 may also be produced, in particular, by injection-molding, from a melt-processable TFE copolymer or from a compound of a melt-processable TFE copolymer.

In order to be able to produce the contact pressing force required for a fluid-tight seal relative to the first component 102 and relative to the second component 108 on the sealing lips 132 or 136, the seal 110 furthermore comprises a spring element 152, which is arranged in the receiving space 140.

Figure 2:
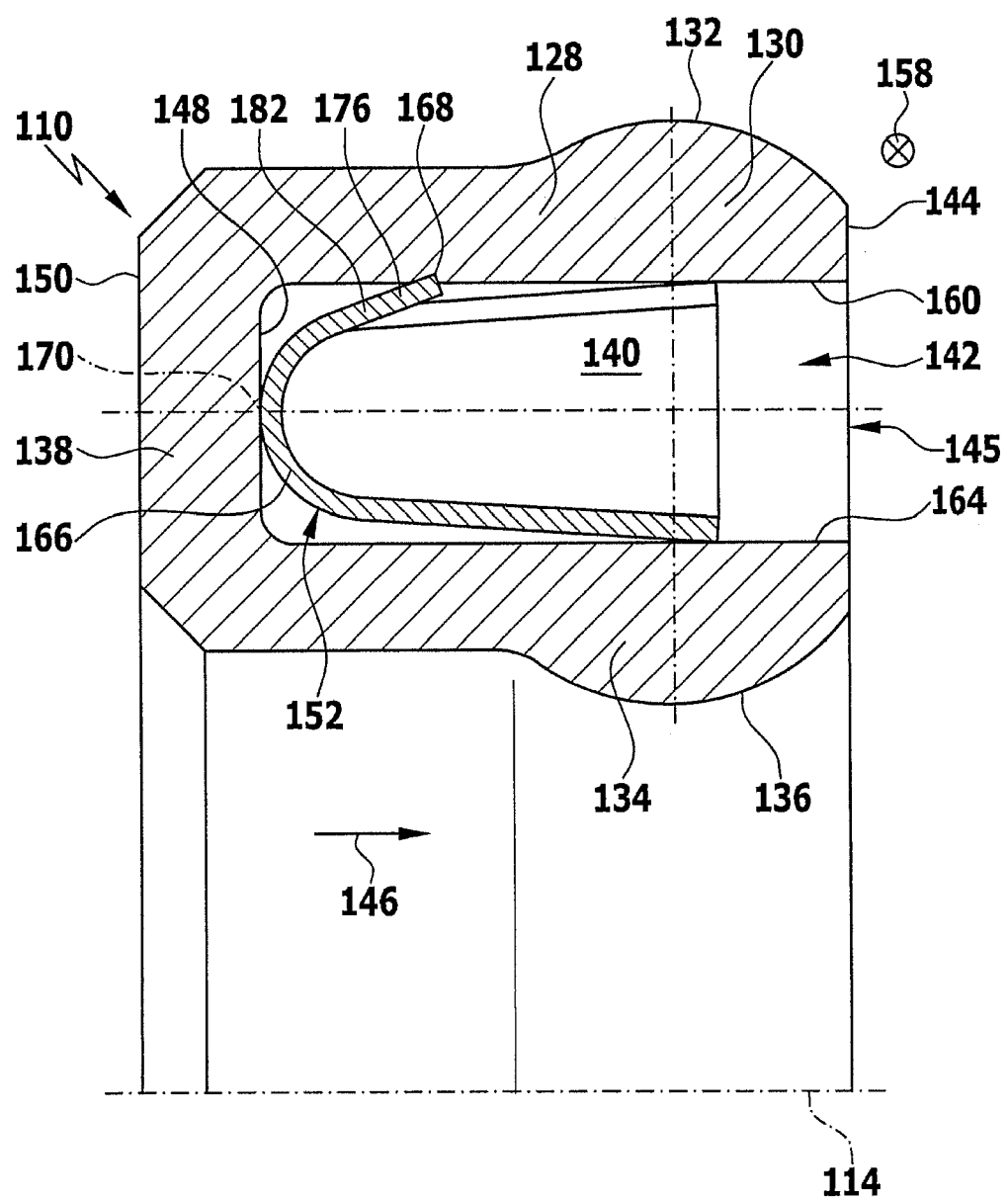
FIG. 2 shows a schematic radial section through the seal of the assembly from FIG. 1.
Figure 4:
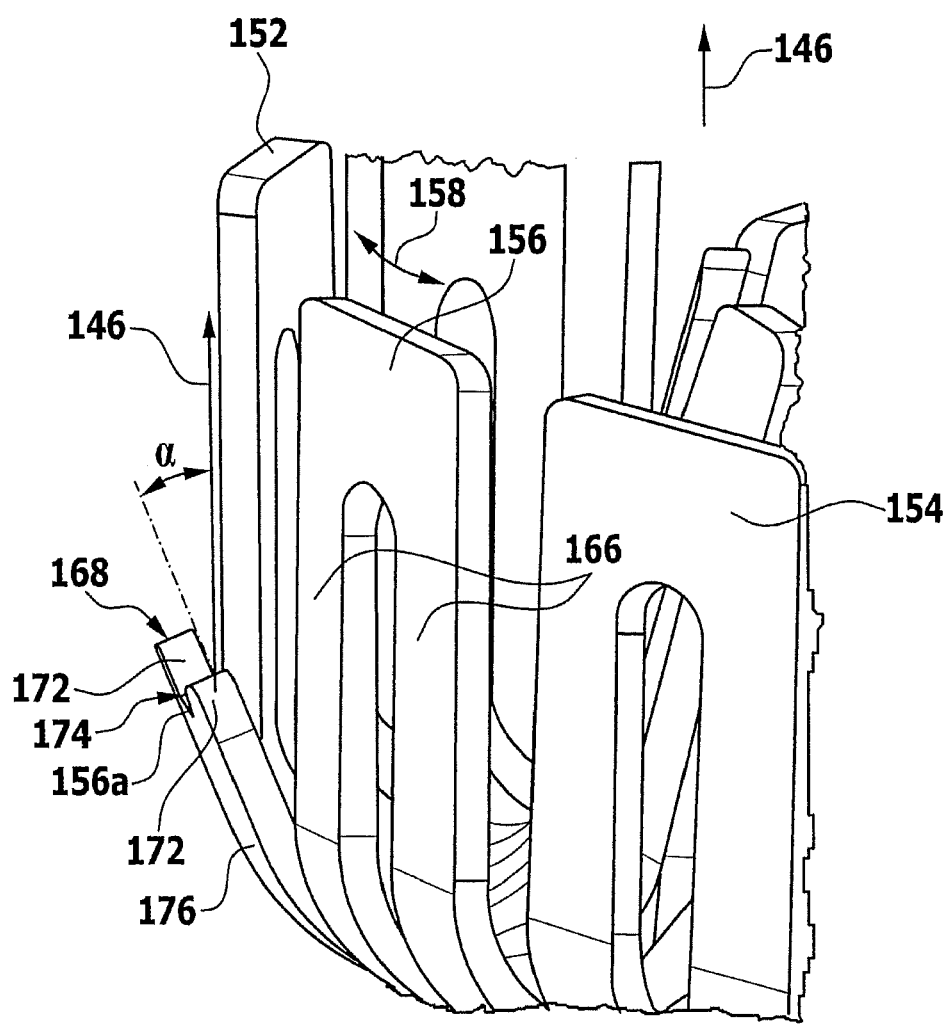
FIG. 4 shows a schematic perspective partial view of a spring element of the seal from FIGS. 1 and 2.

As can best be seen from FIGS. 1, 2 and 4, the spring element 152 comprises a base body 154, which is, for example, meandering in shape, with outer peripheral direction portions 156, which extend, when the seal 110 is in the assembled state, substantially along a peripheral direction 158 of the seal body 128 and abut an outer boundary wall 160 of the receiving space 140 on the (radially inner) inside of the first sealing portion 130, and with inner peripheral direction portions 162, which, when the seal 110 is in the assembled state, extend substantially along the peripheral direction 158 of the seal body 128 and abut an inner boundary wall 164 of the receiving space 140 on the (radially outer) outside of the second sealing portion 134.

Outer peripheral direction portions 156, which follow one another, in each case, in the peripheral direction 158, on the one hand, and inner peripheral direction portions 162 of the spring element 152, on the other hand, are connected to one another by connecting web members 166, which are bent substantially in a U-shape in a radial cross-section, as can best be seen from FIGS. 1, 2 and 4.

The spring element 152 has a multiplicity of outer peripheral direction portions 156 and inner peripheral direction portions 162, in particular, in each case, at least ten outer peripheral direction portions 156 and inner peripheral direction portions 162, preferably, in each case, at least twenty outer peripheral direction portions 156 and inner peripheral direction portions 162, and a corresponding number of connecting web members 166.

In order to retain the spring element 152 in a simple and reliable manner in the receiving space 140 of the seal body 128, the spring element 152 is provided with a plurality of, for example with two or more, preferably with four or more, claw elements 168, which during the assembly of the spring element 152 on the seal body 128 interlock with the seal body 128 in such a way that the spring element 152 is interlocked with the seal body 128 by the digging of the claw elements 168 into the seal body 128 and is therefore fastened to the seal body 128.

As can best be seen from FIGS. 1, 2 and 4, each of the, for example, four claw elements 168 of the spring element 152 is arranged on a respective one of the rear outer peripheral direction portions 156a of the base body 154 of the spring element 152.

In connection therewith, the rear outer peripheral direction portions 156a, on which the claw elements 168 are provided, are arranged closer to the crest line 170 of the spring element 152, about which the connecting web members 166 of the spring element 152 are bent and along which the radius of curvature of the spring element 152 is smallest, than the front outer peripheral direction portions 156b, which, when the seal 110 is in the assembled state, are arranged closer to the mouth opening 145 of the receiving space 140.

This is achieved in that the connecting web members 166a, which connect the rear outer peripheral direction portions 156a to the inner peripheral direction portions 162 that are adjacent along the peripheral direction 158, are shorter than in the other front outer peripheral direction portions 156b of the spring element 152, which are further away from the crest line 170.

As can be seen, for example, from FIG. 4, the claw element 168 may comprise two projections 172, which project from an outer peripheral direction portion 156a and between which an intermediate space 174 is arranged.

Basically, the projections 172 could, however, also be arranged directly next to one another without an intermediate space.

Furthermore, the number of projections 172 per claw element 168 may basically vary as desired; thus, each claw element 168 may, in particular, also comprise only one single projection 172 or more than two projections 172, for example three projections 172.

In order to bias the claw element 168 against the boundary wall 160 of the receiving space 140, in which the claw element 168 is to interlock, and to facilitate the claw element 168 entering the relevant boundary wall 160, the claw element 168, the rear outer peripheral direction portion 156a of the spring element 152, on which the claw element 168 is arranged, and the radially outer portions 176, which face the outer boundary wall 160 of the receiving space 140 when the seal 110 is in assembled state, of the connecting web members 166 of the spring element 152 connected to the rear outer peripheral direction portion 156a are inclined at an acute angle α relative to the axial direction 146 of the spring element 152, which, when the seal 110 is in the assembled state, coincides with the axial direction 146 of the seal 110 and of the assembly 100 (see FIG. 4).

The axial direction 146 is oriented from the groove base 148 of the receiving space 140 toward the mouth opening 145.

The spring element 152 is preferably formed from a resilient metallic material, in particular from a spring steel material.

Furthermore, the material of the spring element 152 is preferably a high-grade steel material, as a material of this type is suitable, in particular for use in aggressive media.

Figure 3:
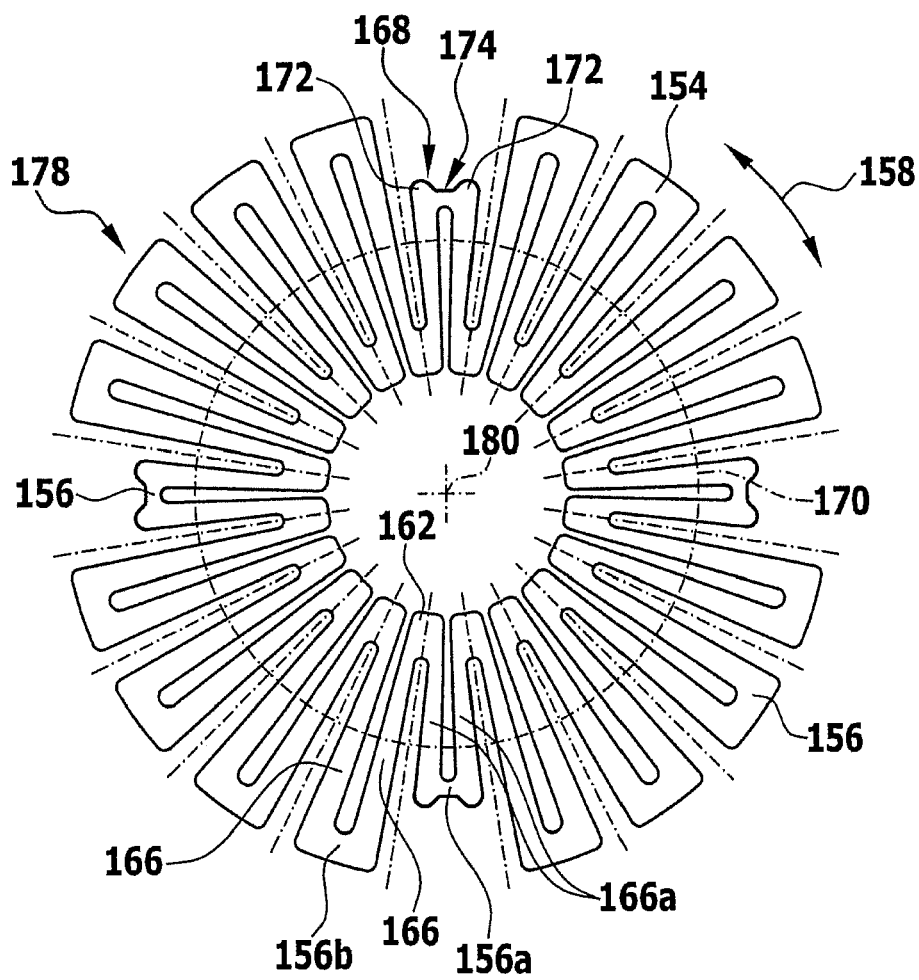
FIG. 3 shows a schematic plan view of a spring element preform of a spring element of the seal from FIGS. 1 and 2.

The spring element 152 is produced by shaping a spring element preform 178 shown in plan view in FIG. 3.

The spring element preform 178 is obtained by separating the spring element preform 178 with the contour shown, from a blank of the starting material, in particular a steel sheet.

In the spring element preform 178, which is firstly substantially flat, the connecting web members 166 are oriented substantially radially to a centre 180 of the spring element preform 178, while the outer peripheral direction portions 156a, 156b and the inner peripheral direction portions 162 of the spring element 152 in the spring element preform 178 are oriented along the peripheral direction 158.

The crest line 170 of the spring element 152 in the spring element preform 178 runs in a circular manner around the centre 180 and substantially centrally between the outer peripheral direction portions 156 and the inner peripheral direction portions 162.

The spring element 152 of the seal 110 is produced from the spring element preform 178 shown in FIG. 3, in that the connecting web members 166 are bent about the crest line 170 such that the outer peripheral direction portions 156 and the inner peripheral direction portions 162 are oriented substantially parallel to the axial direction 146 or inclined at a small acute angle relative to the axial direction 146, the rear outer peripheral direction portions 156a, on which the claw elements 168 are arranged, being inclined at an angle α (for example in the range of about 20° to about 40°) relative to the axial direction 146 (see FIG. 4).

After this shaping process, the spring element 152 is introduced into the receiving space 140 of the seal body 128, in particular pressed in, the spring element 152 automatically being centered in the annular receiving space 140 by the outwardly pointing outer portions 176 of the connecting web members 166a, which form spread apart web members 182 of the spring element 152.

The claw elements 168 arranged on the spread apart web members 182 dig with their projections 172 into the outer boundary wall 160 of the receiving space 140, so the spring element 152 is interlocked with the seal body 128 by means of the claw elements 168 in such a way that the spring element 152 can no longer detach from the seal body 128 and can no longer move out of the receiving space 140.

In order to promote the self-centering of the spring element 152 in the receiving space 140 and the interlocking of the spring element 152 with the seal body 128, the spring element 152 has a plurality of claw elements 168, in particular three claw elements 168 or more, preferably four claw elements 168 or more, the claw elements 168 preferably being distributed substantially equidistantly along the peripheral direction 158 of the spring element 152 (see in particular FIG. 3).

As the spring element 152 is held in the receiving space 140 of the seal body 128 owing to the interlocking by means of the claw elements 168, it is not necessary to provide a retaining lug or other undercut to retain the spring element 152 in the receiving space 140 on the seal body 128 in the region of the receiving space 140.

The danger of a retaining lug of this type being damaged during the assembly of the spring element 152 in the receiving space 140 of the seal body 128 and thus pieces of fluff and/or burrs being able to be produced, which can impair the functionality of the assembly 100, is avoided by the omission of the retaining lug on the seal body 128.

Furthermore, the necessity of carrying out a separate turning process with a delicate turning tool during the production of the seal body 128 is furthermore also dispensed with by the omission of the retaining lug on the seal body 128.

The seal body 128 may, therefore, in particular be formed from a highly filled PTFE compound which is difficult to machine.

Owing to the omission of the retaining lug on the seal body 128, the seal body 128 can also be produced in a simple manner by an injection-molding method, as the finished seal body 128 can easily be removed from the injection-molding tool without the retaining lug.

In particular, the seal body 128 can therefore be produced by injection molding from a melt-processable TFE copolymer or from a compound of a melt-processable TFE copolymer.

Furthermore, since the spring element 152 is also securely held on the seal body 128 without a retaining lug by means of the claw elements 168, the danger is dispensed with of the spring element 152, during operation of the seal 110, displacing relative to the seal body 128 or even moving out of the receiving space 140.

The exact and permanent position of the spring element 152 in the receiving space 140 of the seal body 128 by means of the claw elements 168 also means that the spring element 152 exerts a particularly constant resilient biasing force along the peripheral direction on the first sealing portion 130 with the first sealing lip 132 and on the second sealing portion 134 with the second sealing lip 136, so that particularly constant sealing lip pressures and therefore a particularly high fluid-tightness of the seal 110 are achieved.

When the assembly 100 is assembled, the seal 110 is arranged with the spring element 152 inserted in the receiving space 140 of the seal body 128 between the first component 102 and the second component 108.

In connection therewith, the seal body 128 of the seal 110 abuts with deformation of the first sealing portion 130 with the first sealing lip 132 on a sealing face 184 of the first component 102, in particular on a radially inner peripheral face of the seal holder 106, and with deformation of the second sealing portion 134 with the second sealing lip 136 on a sealing face 186 of the second component 108, in particular on the peripheral face of the cylindrical second component 108 (this deformation of the first sealing portion 130 and the second sealing portion 134 is therefore not taken into account in the schematic view of FIG. 1, which is why, in this schematic view, the first sealing lip 132 and the first component 102 and the second sealing lip 136 and the second component 108 overlap).

When the assembly 100 is in the assembled state, the first sealing portion 130 substantially has the external radius R and the second sealing portion 134 has the internal radius r.

Furthermore, the seal body 128, when in the assembled state, preferably abuts with its closed end face 150 on the end face 124 of the base part 104 of the first component 102.

Owing to the seal at the first sealing lip 132 and the second sealing lip 136, when the assembly 100 is in the assembled state, the seal 110 separates a first media space 188 and a second media space 190 from one another in a substantially fluid-tight manner.

The media spaces 188 and 190 can therefore be filled with different fluid media, for example with air, fuel or oil, during operation of the assembly 100.

The second component 108 is preferably moveable relative to the first component 102 during operation of the assembly 100.

In connection therewith, the second component 108 may be rotatable relative to the first component 102 about the longitudinal axis 114 and/or may be displaceable along the longitudinal axis 114, in other words in the axial direction 146 or counter to the axial direction 146.

In this case, the seal 110 preferably remains stationary with respect to the first component 102.

However, it may basically also be provided that the seal 110 is connected to the second component 108 in such a way that it moves together with the second component 108 relative to the first component 102.

When the seal 110 is stationarily arranged with respect to the first component 102, the first sealing portion 130 of the seal 110 abutting the first component 102 is a static sealing portion, while the second portion 134 of the seal 110 abutting the second component 108 is a dynamic sealing portion.

For example, the first media space 188 may be filled with an engine oil and the second media space 190 with another liquid, for example a fuel, in particular petrol.

The assembly 100 may form a component of a high-pressure pump, in particular a high-pressure pump for injecting a fuel into an internal combustion engine.

Figure 5:
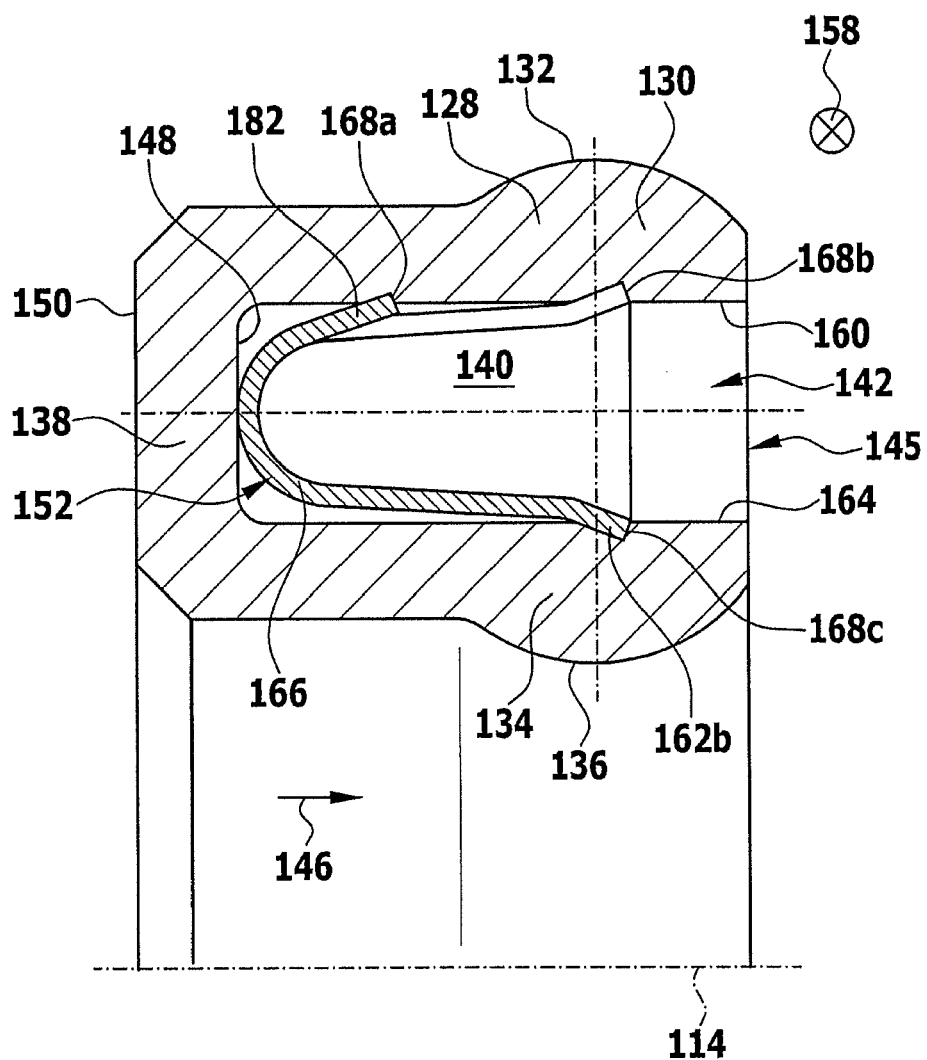
FIG. 5 shows a schematic radial section through a second embodiment of the seal, in which the spring element has at least two claw elements interlocked with a first sealing portion of a seal body of the seal in different axial positions and at least one claw element interlocked with a second sealing portion opposing the first sealing portion.
Figure 6:
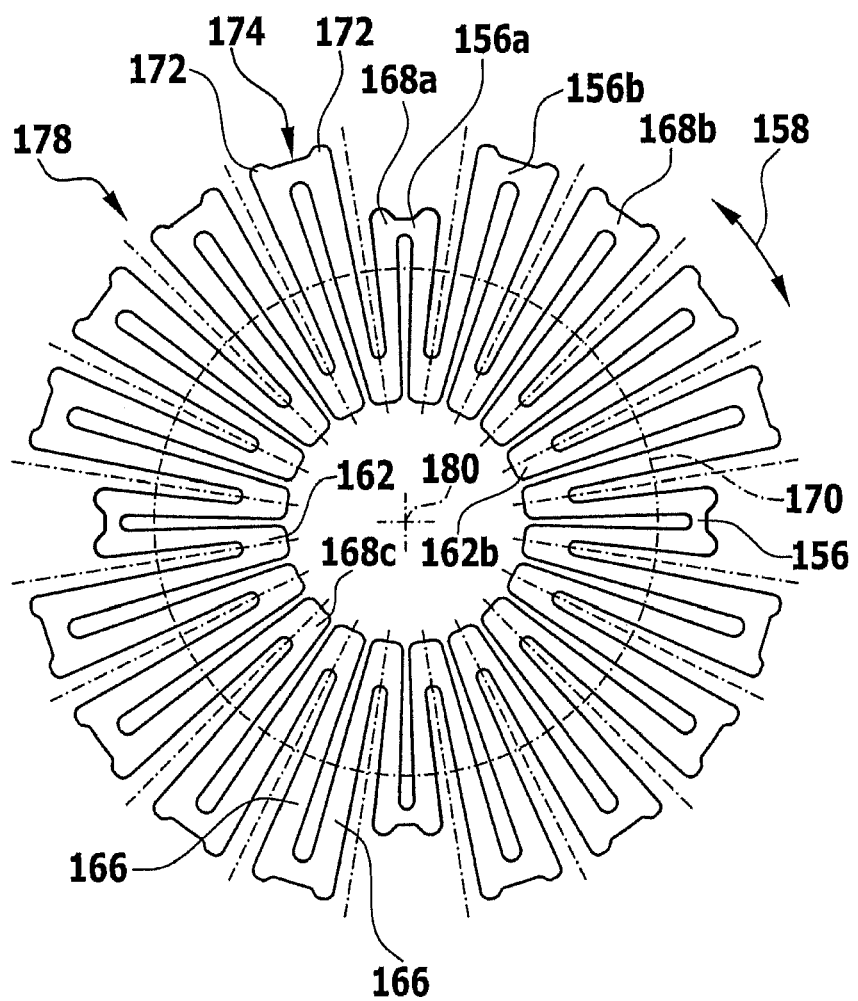
FIG. 6 shows a plan view of a spring element preform of the spring element of the seal from FIG. 5.
Figure 7:
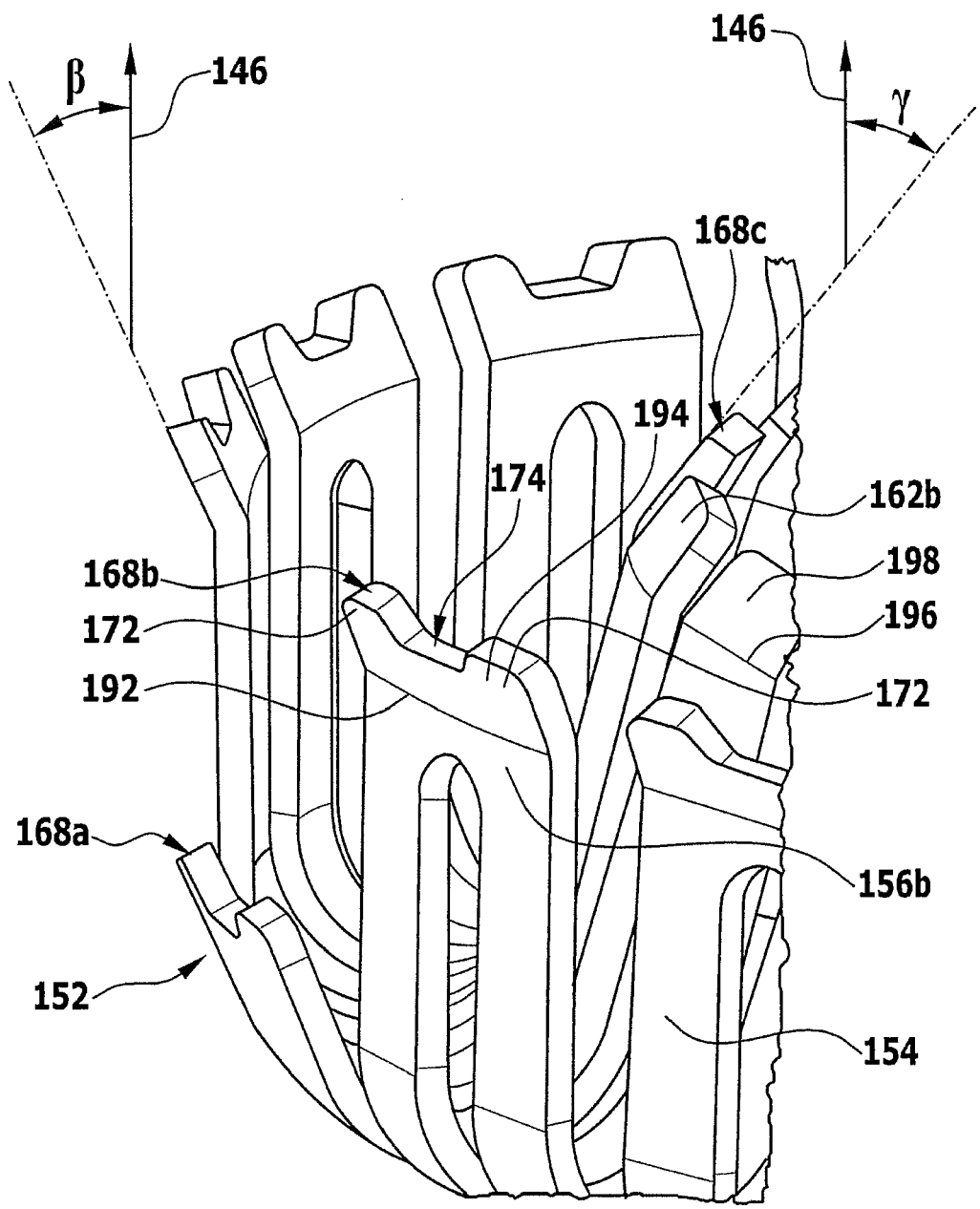
FIG. 7 shows a schematic perspective partial view of the spring element of the seal from FIG. 5.

A second embodiment of a seal 110 shown in FIGS. 5 to 7 differs from the first embodiment shown in FIGS. 1 to 4 in that claw elements 168 are not only provided on individual outer peripheral direction portions 156 of the spring element 152, but also on inner peripheral direction portions 162 of the spring element 152.

Furthermore, claw elements 168 are provided on outer peripheral direction portions 156a and 156b, which are connected to connecting web members 166 of different lengths, so these various outer peripheral direction portions 156 are located at different axial positions of the spring element 152 (in other words at different positions with respect to the axial direction 146 of the spring element 152).

The claw elements, which are arranged on the rear outer peripheral direction portions 156a will be called claw elements 168a below, the claw elements arranged on the front outer peripheral direction portions 156b will be called claw elements 168b and the claw elements arranged on the front inner peripheral direction portions 162b will be called claw elements 168c.

As can best be seen from FIG. 6, it may in particular be provided that all the rear outer peripheral direction portions 156a and all the front outer peripheral direction portions 156b and all the inner peripheral direction portions 162 are provided with a claw element 168 in each case.

As can best be seen from FIG. 7, the claw elements 168a on the rear outer peripheral direction portions 156a are configured exactly as in the first embodiment shown in FIGS. 1 to 4.

The claw elements 168b on the front outer peripheral direction portions 156b are in each case configured as a portion 194, which is outwardly bent about a bend line 192, of the respective front outer peripheral direction portion 156b, the respective outwardly bent portion 194 being inclined relative to the axial direction 146 of the spring element 152 about an acute angle β, for example in the range of about 20° to about 40°.

Each of these claw elements 168b may comprise a plurality of, for example two, projections 172 projecting from the outwardly bent portion 194 and, in each case, comprise an intermediate space 174 arranged in between.

The claw elements 168c arranged on the inner peripheral direction portions 162 are configured, in this embodiment, as portions 198 bent inwardly about a bend line in each case, in other words bent toward the longitudinal axis 114 of the spring element 152.

These inwardly bent portions 198 are inclined relative to the axial direction 146 of the spring element 152 about an acute angle γ, for example in the range of about 20° to about 40°.

The claw elements 168c on the inner peripheral direction portions 162 may, as shown in FIG. 7, only comprise the inwardly bent portions 198 of the inner peripheral direction portions 162, just as the claw elements 168a and 168b on the outer peripheral direction portions 156a or 156b comprise one or more projections 172 projecting from the respective portion 198 bent inwardly.

The spring element 152 of the second embodiment of the seal 110 is produced from the spring element preform 178 shown in FIG. 6 by shaping the connecting web members 166 and by bending the outwardly bent portions 194 of the front outer peripheral direction portions 156 around the bend lines 192 and by bending the inwardly bent portions 198 of the inner peripheral direction portions 162 around the bend lines 196.

After these shaping processes, the spring element 152 is introduced into the receiving space 140 of the seal body 128, where the spring element 152 interlocks by means of the claw elements 168a and 168b on the outer peripheral direction portions 156a and 156b with the outer boundary wall 160 of the receiving space 140 and interlocks by means of the claw elements 168c on the inner peripheral direction portions 162 with the inner boundary wall 164 of the receiving space 140.

Owing to the interlocking of the spring element 152 by means of claw elements 168 on the two mutually opposing boundary walls 160 and 164 of the receiving space 140 and owing to the interlocking of the spring element 152 by means of claw elements 168, which are arranged at different axial positions of the spring element 152 and therefore at different spacings from the mouth opening 145 of the receiving space 140 and at different spacings from the groove base 148 of the receiving space 140, a particularly secure hold of the spring element 152 on the seal body 128 and a particularly reliable centering of the spring element 152 on the seal body 128 are achieved.

In connection therewith, the proportion of rear outer peripheral direction portions 156a on the total number of the outer peripheral direction portions 156 is basically selectable as desired.

In the embodiment shown in FIG. 6, the number of rear outer peripheral direction portions 156a is, for example, four and the number of rear outer peripheral direction portions 156a is smaller than the number of front outer peripheral direction portions 156b.

However, the number of rear outer peripheral direction portions 156a may also basically be greater than the number of front outer peripheral direction portions 156b.

Otherwise, the second embodiment of a seal 110 shown in FIGS. 5 to 7 coincides with respect to structure, mode of functioning and mode of production with the first embodiment shown in FIGS. 1 to 4, to the description of which reference is to this extent made.

Figure 8:
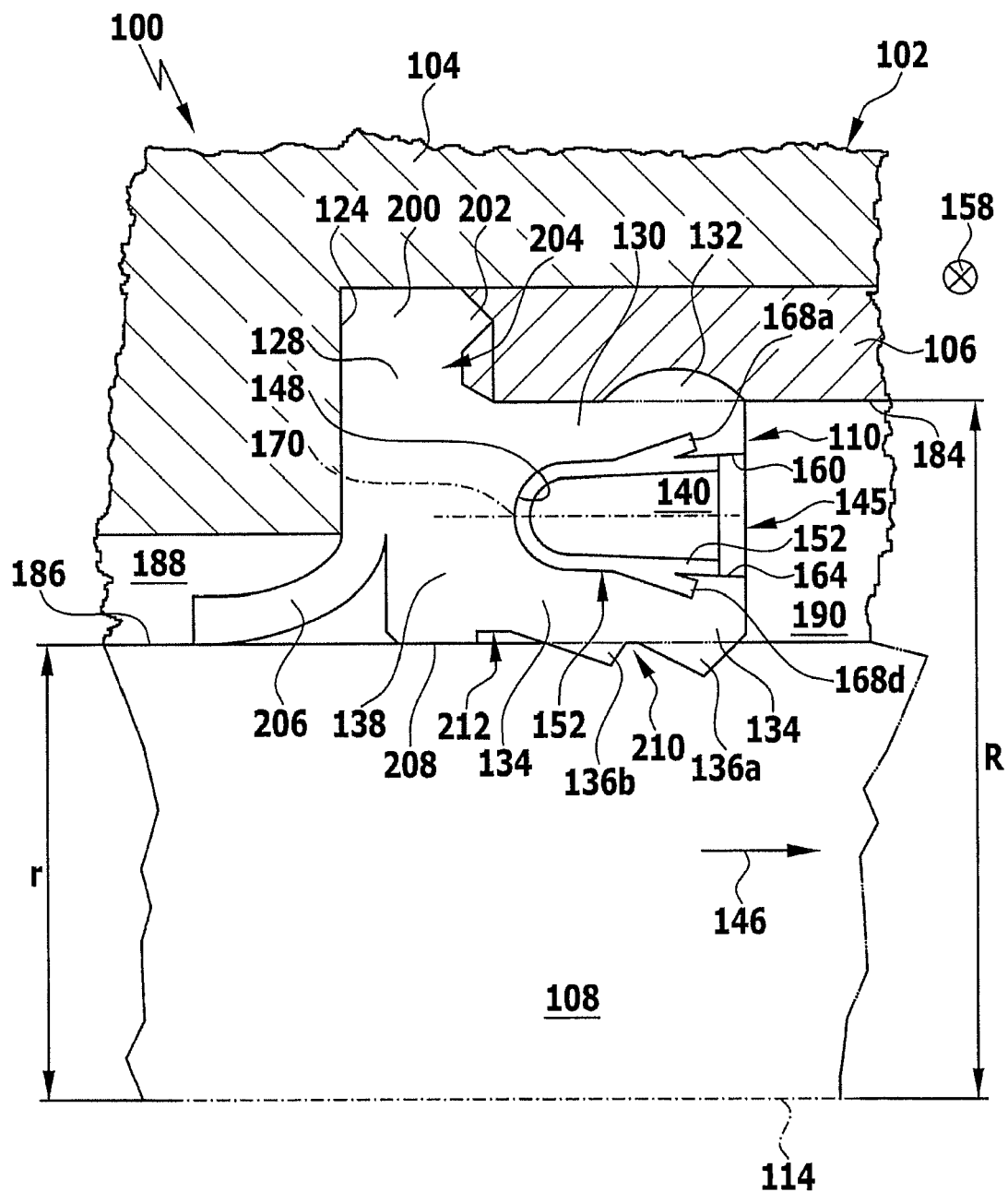
FIG. 8 shows a schematic section through an assembly with a first component, a second component and a third embodiment of the seal for sealing the sealing gap between the first component and the second component, the spring element of the seal being interlocked with a first sealing portion by means of at least one claw element and with a second sealing portion of a seal body of the seal opposing the first sealing portion by means of at least one claw element.

An alternative embodiment of an assembly 100, shown in FIG. 8, with a third embodiment of the seal 110 differs from the first embodiment shown in FIGS. 1 to 4 in that the seal body 128 in the third embodiment, in addition to the first sealing portion 130, the second sealing portion 134 and the web 138, comprises a holding portion 200 arranged radially outside the first sealing portion 130, said holding portion comprising a projection 202 projecting in the axial direction 146. When the seal 110 is in the assembled state, this projection is arranged in an intermediate space between the seal holder 106 and the end face 124 of the base part 104 and is squeezed axially against the seal holder 106, so that an increased sealing pressing is obtained (this squeezing is not shown in the schematic view of FIG. 8). As a result, the seal body 128 as a whole is secured against a displacement relative to the first component 102 in the radial direction 126.

Furthermore, in this embodiment of the seal 110, the seal body 128 is provided with an additional wiper lip 206, which, when the seal 110 is in the assembled state, abuts the sealing face 186 of the second component 108, in other words, in particular on the peripheral face of a cylindrical second component 108.

Dirt particles from the first media space 188 are kept away from the second sealing portion 134 by this additional wiper lip 206.

The wiper lip 206 may, in particular, be configured as a memory wiper lip, in other words as a wiper lip, which is biased against the associated sealing face 186 by a memory effect of the fluoropolymer material used, in particular a PTFE or PTFE compound material, a melt-processable TFE copolymer or a compound of a melt-processable TFE copolymer.

This memory effect comes about in that the memory wiper lip is firstly produced by machining with an internal diameter that is smaller than the external diameter of the second component 108, and the memory wiper lip is then deformed, at room temperature or at an elevated temperature, in such a way that the second component 108 can be guided through the wiper lip 206. During a heating of the assembly 100 during operation thereof, the PTFE-containing material of the memory wiper lip is deformed back in the direction of its original shape. Owing to this so-called "plastic memory effect", the wiper lip 206 is therefore biased against the sealing face 186 and is continuously readjusted against the second component 108 in the course of the wear of the wiper lip 206 during operation of the assembly 100 so that an adequate wiper effect of the wiper lip 206 is always ensured.

Furthermore, in the embodiment of the seal 110 shown in FIG. 8, the second sealing portion 134 does not only have a single sealing lip, but a plurality of, for example two or three, second sealing lips 136*a* and 136*b* following one another in the axial direction 146 as well as a substantially cylindrical contact face 208 resting on the sealing face 186 of the second component 108 when the assembly 100 is in the assembled state.

A first leakage storage space 210 is formed between the front second sealing lip 136*a* and the rear second sealing lip 136*b*, and a second leakage storage space 212 is formed between the rear second sealing lip 136 and the contact face 208 of the second sealing portion 134.

When the seal 110 is in the assembled state, the front second sealing lip 136*a*, the rear second sealing lip 136*b* and the contact face 208 of the second sealing portion 134 abut the sealing face 186 of the second component 108. The leakage of the medium out of the second media space 190 into the first media space 188 is significantly reduced by this triple or (when three second sealing lips are used) quadruple seal.

When the second component 108 moves relative to the seal 110 counter to the axial direction 146 during operation of the assembly 100, leakage liquid from the second media space 190 is stored in the leakage storage spaces 210 and 212 of the second sealing portion 134 and is urged back into the second media space 190 during the return movement of the second component 108 in the axial direction 146, in particular during the return stroke of a piston arranged on the second component 108.

The spring element 152 of the seal 110 has, in this embodiment, just as in the embodiments shown in FIGS. 1 to 7, rear outer claw elements 168*a*, which are arranged on rear outer peripheral direction portions 156*a* and by means of which the spring element 152 is interlocked with the outer boundary wall 160 of the receiving space 140 of the seal body 128.

In addition to this, the spring element 152, in this third embodiment, has rear inner claw elements 168*d*, which are arranged on rear inner peripheral direction portions 162*a* of the spring element 152 and are interlocked with the inner boundary wall 164 of the receiving space 140.

As can be seen from FIG. 8, the rear outer claw elements 168*a* and the rear inner claw elements 168*d* are substantially arranged at the same axial position of the spring element 152, in other words at the same position along the axial direction 146.

The groove base 148 of the receiving space 140 may be curved in this embodiment and, in particular, be adapted to the curvature of the spring element 152 in the region of the crest line 170.

Otherwise, the third embodiment of the seal 110 shown in FIG. 8, coincides with respect to structure, mode of functioning and mode of production with the embodiments shown in FIGS. 1 to 7, to the above description of which reference is to this extent made.

Figure 9:
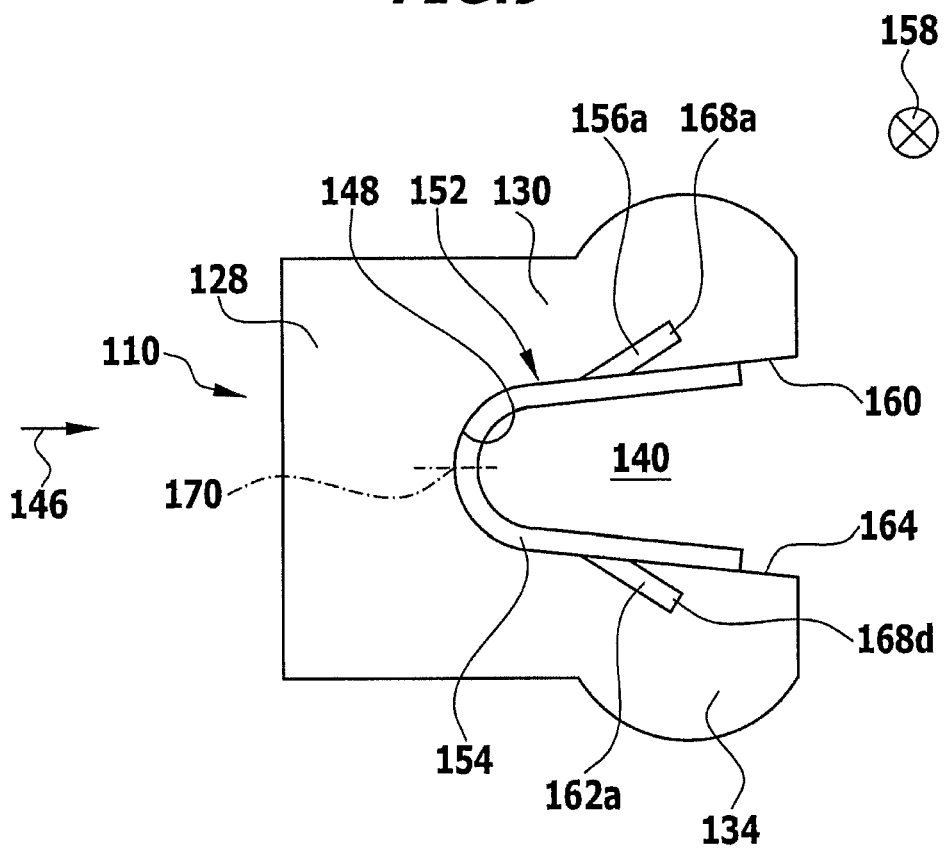
FIG. 9 shows a schematic radial cross-section through a fourth embodiment of the seal, the spring element of the seal being interlocked with the first sealing portion by means of at least one claw element and with the second sealing portion by means of at least one claw element.

A fourth embodiment of the seal 110 shown in FIG. 9, differs from the first embodiment shown in FIGS. 1 to 4 in that the spring element 152 of the seal 110 not only has at least one rear outer claw element 168*a*, which is arranged on a rear outer peripheral direction portion 156*a* of the spring element 152 and is interlocked with the outer boundary wall 160 of the receiving space 140 of the seal body 128, but, in addition, also has at least one rear inner claw element 168*d*, which is arranged on a rear inner peripheral direction portion 162*a* and is interlocked with the inner boundary wall 164 of the receiving space 140 of the seal body 158.

Otherwise, the fourth embodiment of the seal 110 shown in FIG. 9 coincides with respect to structure, mode of functioning and mode of production with the first embodiment shown in FIGS. 1 to 4, to the above description of which reference is to this extent made.

Figure 10:
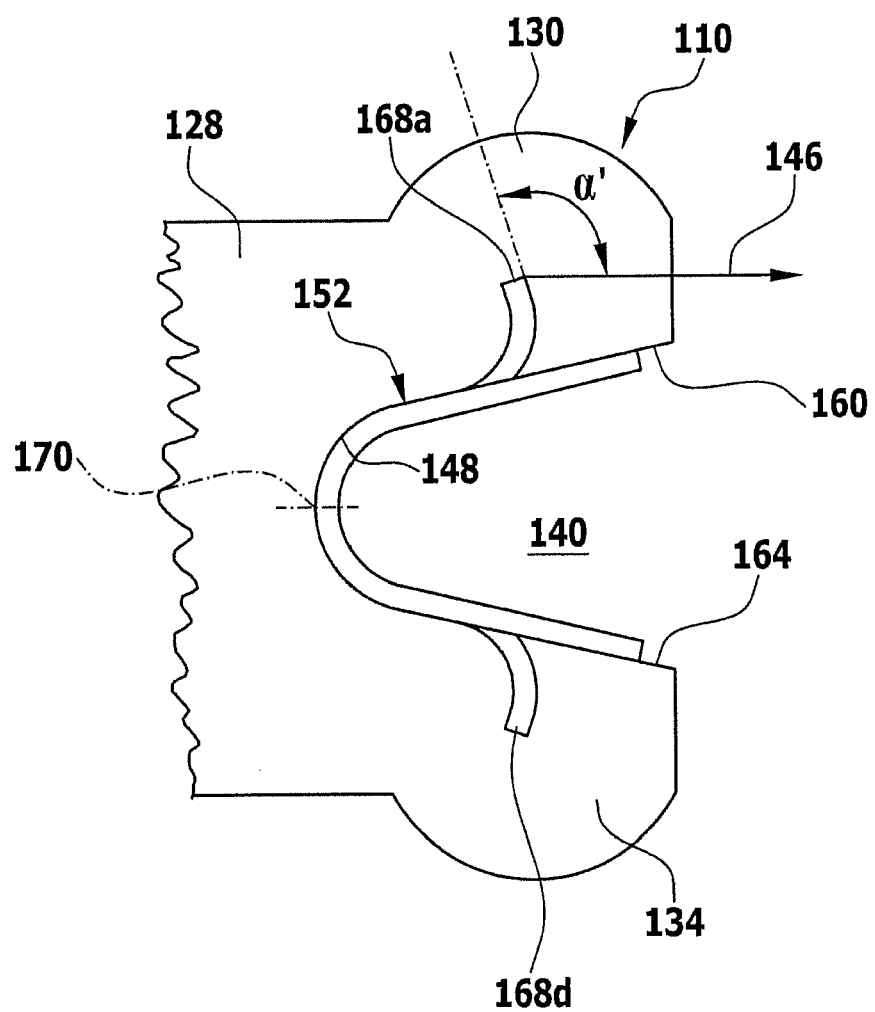
FIG. 10 shows a schematic radial cross-section through a fifth embodiment of the seal, the spring element being interlocked with the first sealing portion by means of at least one claw element and with the second sealing portion by means of at least one claw element.

A fifth embodiment of the seal 110 shown in FIG. 10, differs from the fourth embodiment shown in FIG. 9 in that the claw elements 168*a* and 168*d* in this embodiment are bent back to such an extent relative to the axial direction 146 of the spring element 152 that the claw elements 168*a* and 168*d* with the axial direction 146 do not enclose an acute angle α, but a right angle or an obtuse angle α' (see FIG. 10).

As a result, a particularly secure hold of the spring element 152 in the receiving space 140 of the seal body 128 is achieved.

Otherwise, the fifth embodiment of the seal 110 shown in FIG. 10 coincides with respect to structure, mode of functioning and mode of production with the fourth embodiment shown in FIG. 9, to the above description of which reference is to this extent made.

Figure 11:
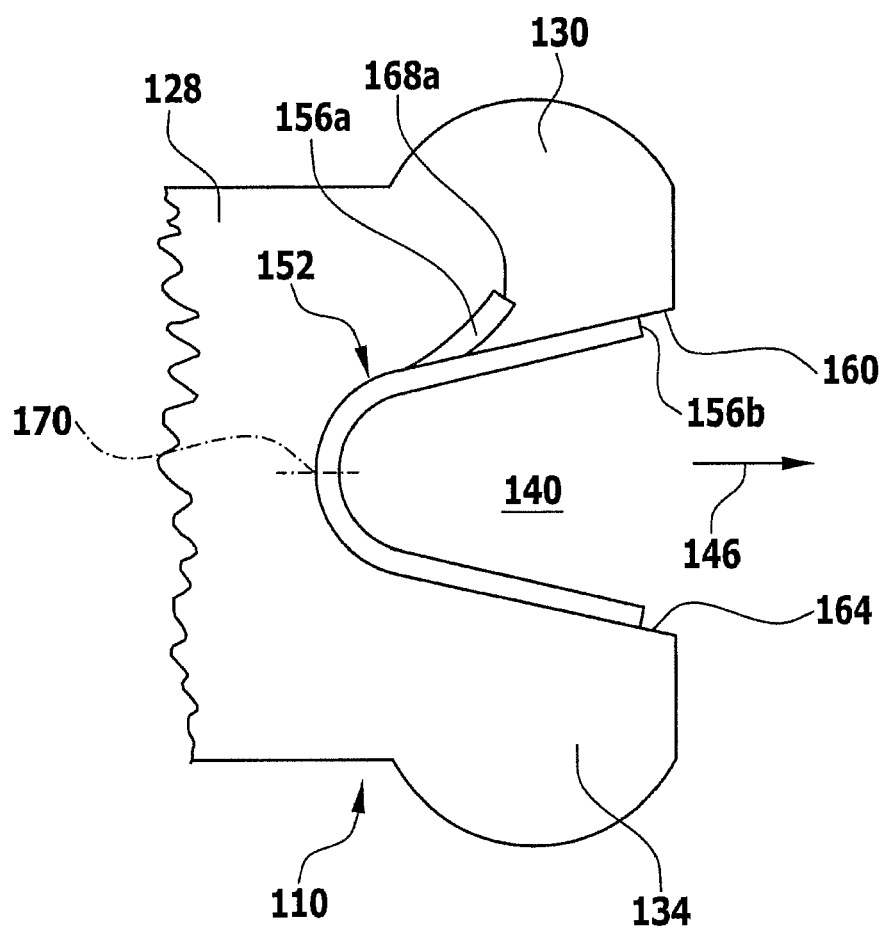
FIG. 11 shows a schematic radial cross-section through a sixth embodiment of the seal, the spring element being interlocked with the first sealing portion by means of at least one claw element, but not being interlocked with the opposing second sealing portion.

A sixth embodiment of the seal 110 shown in FIG. 11 differs from the first embodiment shown in FIGS. 1 to 4 substantially only in that the rear outer claw elements 168*a* are arranged closer to the front edges of the front outer peripheral direction portions 156*b* of the spring element 152.

Furthermore, the groove base 148 of the seal body 128 in this embodiment (as also in the embodiments according to FIGS. 9 and 10) may be curved and, in particular, be adapted to the curvature of the spring element 152 in the region of the crest line 170 of the spring element 152.

Otherwise, the sixth embodiment of the seal 110 shown in FIG. 11 coincides with respect to structure, mode of functioning and mode of production with the first embodiment shown in FIGS. 1 to 4, to the above description of which reference is to this extent made.

Figure 12:
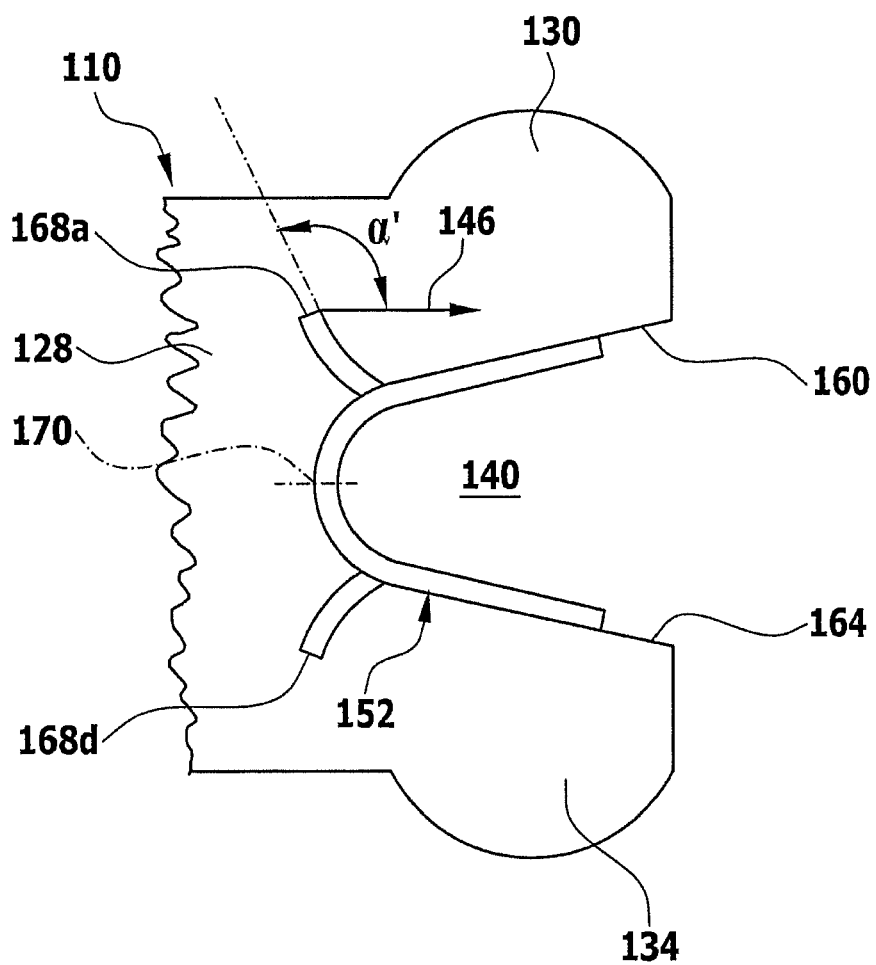
FIG. 12 shows a schematic radial cross-section through a seventh embodiment of the seal, the spring element being interlocked with the first sealing portion by means of at least one claw element and with the second sealing portion by means of at least one claw element.

A seventh embodiment of the seal 110 shown in FIG. 12 differs from the fifth embodiment shown in FIG. 10 in that the rear outer claw elements 168*a* and the rear inner claw elements 168*d* on the spring element 152 are arranged so far to the rear that the ends of these claw elements 168*a*, 168*d* lie behind the crest line 170 of the spring element 152 in the axial direction 146. As a result, it is particularly easy for the claw elements 168*a*, 168*d* to dig into the outer boundary wall 160 or into the inner boundary wall 164 of the receiving space 140 of the seal body 128 and to firmly lock there.

Otherwise, the seventh embodiment of the seal 110 shown in FIG. 12 coincides with respect to the structure, mode of functioning and mode of production with the fifth embodiment shown in FIG. 10, to the above description of which reference is to this extent made.

Figure 13:
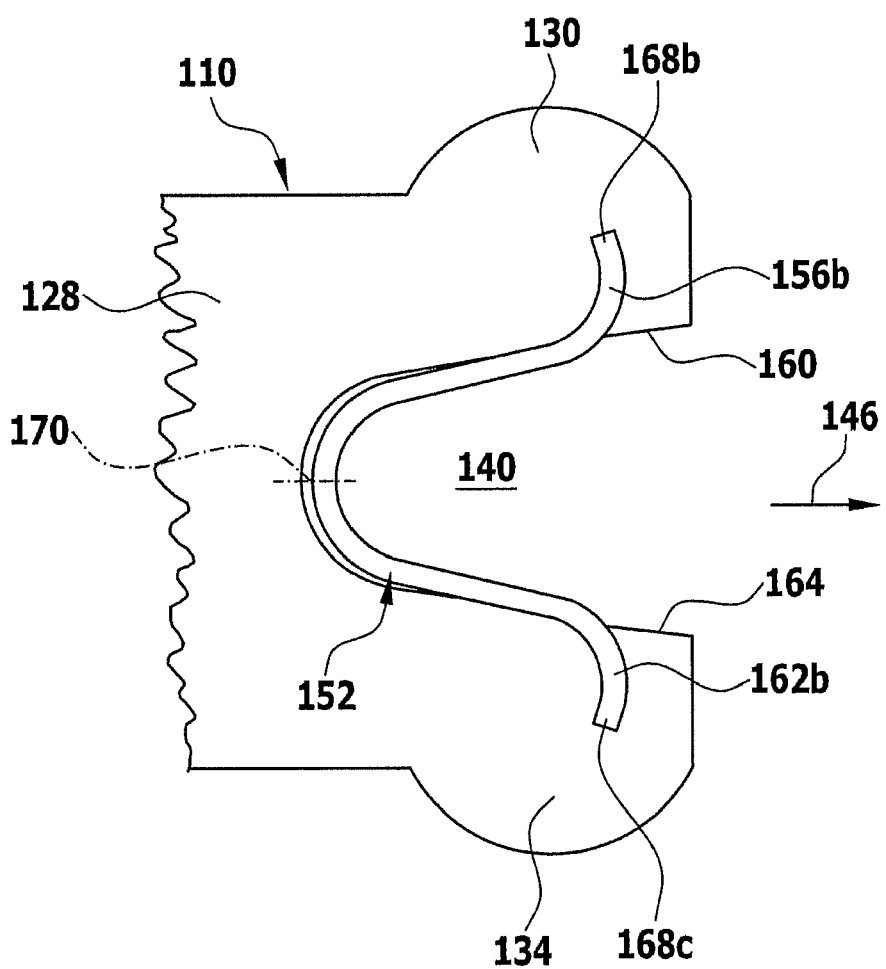
FIG. 13 shows a schematic radial cross-section through an eighth embodiment of the seal, the spring element being interlocked with the first sealing portion by means of at least one claw element, which is arranged on an end of the spring element facing a mouth opening of a receiving space, in which the spring element is arranged, and being interlocked with the second sealing portion by means of at least one claw element, which is also arranged on an end of the spring element facing the mouth opening of the receiving space.

An eighth embodiment of the seal 110 shown in FIG. 13 differs from the fifth embodiment shown in FIG. 10 in that the spring element 152, instead of the rear outer claw elements 168*a* and the rear inner claw elements 168*d*, has front outer claw elements 168*b*, which are arranged on front outer peripheral direction portions 156*b* of the spring element and are interlocked with the outer boundary wall 160 of the receiving space 140 of the seal body 128, and has front inner claw elements 168*c*, which are arranged on front inner peripheral direction portions 162*b* of the spring element 152 and are interlocked with the inner boundary wall 164 of the receiving space 140 of the seal body 128.

Otherwise, the eighth embodiment of the seal 110 shown in FIG. 13 coincides with respect to structure, mode of functioning and mode of production with the fifth embodiment shown in FIG. 10, to the above description of which reference is to this extent made.

Figure 14:
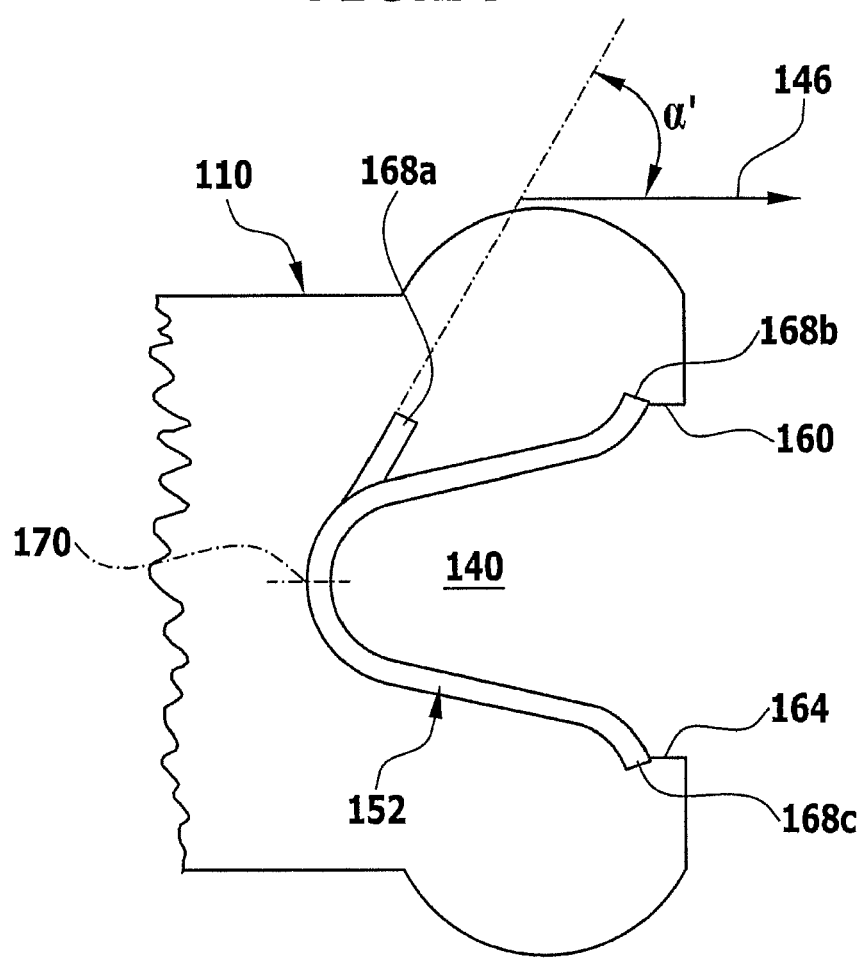
FIG. 14 shows a schematic radial cross-section through a ninth embodiment of the seal, the spring element being interlocked with the first sealing portion by means of at least two claw elements, which are arranged in different axial positions, and with the second sealing portion by means of at least one claw element.

A ninth embodiment of the seal 110 shown in FIG. 14 differs from the second embodiment shown in FIGS. 5 to 7 only in that the claw elements 168*a*, 168*b* and 168*c* in the ninth embodiment enclose a larger angle α with the axial direction 146 of the spring element 152 than in the second embodiment.

Furthermore, the base groove 148 of the receiving space 140 in the ninth embodiment, just as in the seventh embodiment shown in FIG. 12 and in the eighth embodiment shown in FIG. 13, may be curved and, in particular, be adapted to the curvature of the spring element 152 in the region of the crest line 170.

Otherwise, the ninth embodiment of the seal 110 shown in FIG. 14 coincides with respect to structure, mode of functioning and mode of production with the second embodiment shown in FIGS. 5 to 7, to the above description of which reference is to this extent made.

Figure 15:
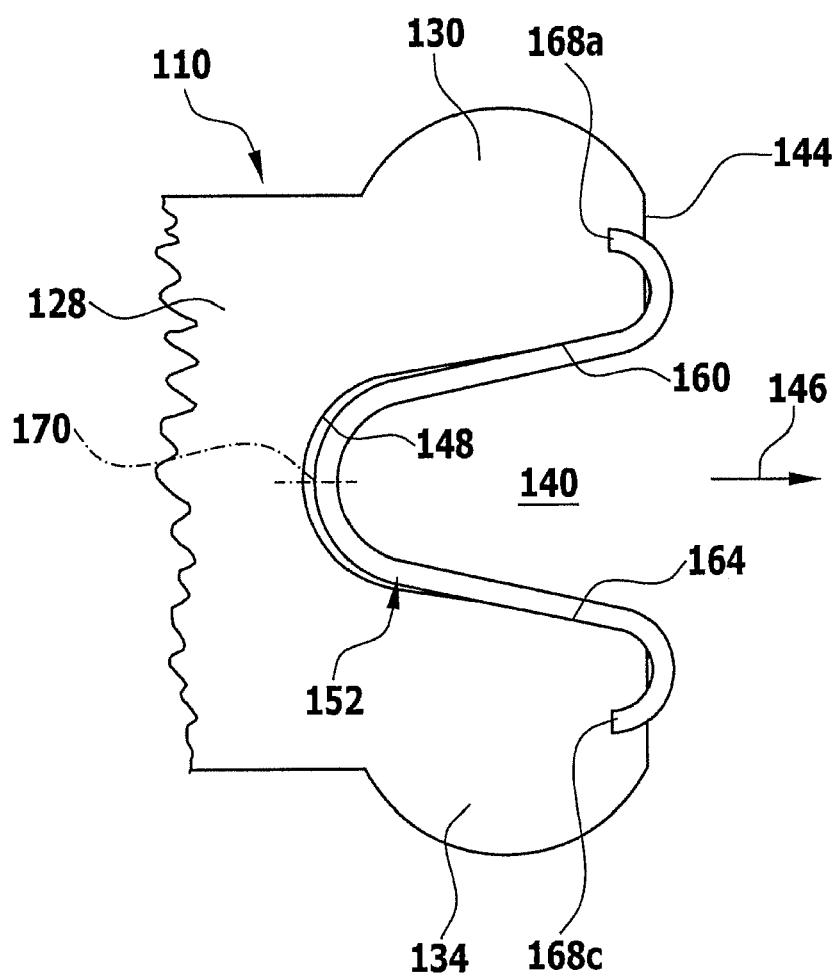
FIG. 15 shows a schematic radial cross-section through a tenth embodiment of the seal, the spring element being interlocked with an end face of the first sealing portion by means of at least one claw element and with an end face of the second sealing portion by means of at least one claw element.
Figure 16:
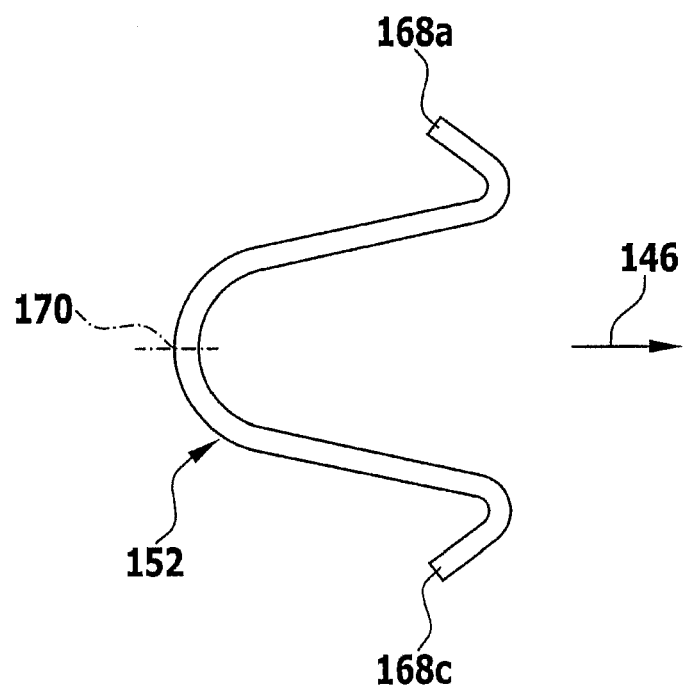
FIG. 16 shows a schematic radial cross-section through the spring element of the seal from FIG. 15.

A tenth embodiment of the seal 110 shown in FIGS. 15 and 16 differs from the eighth embodiment shown in FIG. 13 in that the front outer claw elements 168*b* and the front inner claw elements 168*c* are not interlocked with the boundary walls 160 or 164 of the receiving space 140 of the seal body 128, but, instead, are interlocked with the open end face 144 of the seal body 128. In this embodiment, the spring element 152 therefore partially extends out of the receiving space 140 of the seal body 128 through the mouth opening 145 of the receiving space 140, Otherwise, the tenth embodiment of the seal 110 shown in FIGS. 15 and 16 coincides with respect to structure, mode of functioning and mode of production with the eighth embodiment shown in FIG. 13, to the above description of which reference is to this extent made.

An eleventh embodiment of the seal 110 shown in FIG. 17 differs from the third embodiment shown in FIG. 8 in that in this eleventh embodiment of the seal 110, the seal 110 is configured as a double seal, which comprises not only one, but two second sealing portions 134*a* and 134*b* spaced apart from one another in the axial direction 146 with two respective second sealing lips 136*a*, 136*b* for sealing relative to the second component 108 and not only one, but two first sealing portions 130*a*, 130*b* with a first respective sealing lip 132 for sealing relative to the first component 102.

The seal 110 configured as a double seal may, in particular, be substantially mirror-symmetrical with respect to a transverse centre plane 214 of the seal 110 oriented perpendicular to the axial direction 146 and running through the cylindrical contact face 208.

The seal body 128 in this embodiment has two receiving spaces 140*a*, 140*b*, which are in each case arranged between a first sealing portion 130*a*, 130*b* and an opposing second sealing portion 134*a* or 134*b*, a respective spring element 152*a*, 152*b* being at least partially received in each of the receiving spaces 140*a*, 140*b*.

Each of the spring elements 152*a*, 152*b* of the seal 110, in this embodiment, just as in the embodiment shown in FIG. 8, has rear outer claw elements 168*a* arranged on rear outer peripheral direction portions 156*a*, by means of which the respective spring element 152*a*, 152*b* is interlocked with the outer boundary wall 160 of the respective receiving space 140*a* or 140*b* of the seal body 128.

In addition to this, each of the spring elements 152*a*, 152*b*, just as in the embodiment shown in FIG. 8, has rear inner claw elements 168*d*, which are arranged on rear inner peripheral direction portions 162*a* of the respective spring element 152*a*, 152*b* and are interlocked with the inner boundary wall 164 of the respective receiving space 140*a*, 140*b*.

As can be seen from FIG. 17, the rear outer claw elements 168*a* and the rear inner claw elements 168*d* are substantially arranged at the same axial position of the respective spring element 152*a*, 152*b*, in other words at the same position along the axial direction 146.

The groove bases 148 of the receiving spaces 140*a*, 140*b* may be curved in this embodiment, and in particular adapted to the curvature of the respective spring element 152*a*, 152*b* in the region of the crest line 170.

In the assembly 100 shown in FIG. 17, the first component 102 may be formed in one piece and the holding portion 200 of the seal body 128 from FIG. 8 may be dispensed with in this embodiment.

Furthermore, it may be provided that the assembly 100 comprises a, preferably resilient, holding ring 216, which is arranged on a side of the seal 110 remote from the end face 124 of the first component 102, so the seal body 128 is held between the holding ring 216 and the end face 124 of the first component 102 and held by a positive-locking fit and secured against displacement along the axial direction 146.

The wiper lip 206 of the embodiment from FIG. 8 may be dispensed with in the eleventh embodiment from FIG. 17; it would also be possible to additionally arrange a wiper lip 206 of this type on a free end of one of the two second sealing portions 134*a*, 134*b*.

Otherwise, the eleventh embodiment of the seal 110 shown in FIG. 17 coincides with respect to structure, mode of functioning and mode of production with the third embodiment shown in FIG. 8, to the above description of which reference is to this extent made.

The invention claimed is:

1. A method for producing a seal for sealing a sealing gap between a first component and a second component, comprising the following:
producing a seal body with at least one sealing portion and a receiving space;
producing a spring element with at least one claw element, wherein the spring element comprises a base body, which is meandering in shape, said base body, when viewed in a substantially unbent form, comprising a plurality of outer peripheral direction portions and a plurality of inner peripheral direction portions, wherein the inner and outer peripheral direction portions are arranged in an alternating manner and subsequent inner and outer peripheral direction portions are connected to one another by connecting web members oriented substantially radially from a center;
wherein the seal body comprises a first sealing portion for applying against the first component and a second sealing portion for applying against the second component, wherein the spring element, when the seal is in the assembled state, biases the first sealing portion against the first component and the second sealing portion against the second component and wherein the seal body has no retaining projection to retain the spring element in the receiving space;
wherein the second component has a portion which is substantially cylindrical and has a longitudinal axis, the first sealing portion forming a radially outer leg of the seal body and the second sealing portion forming a radially inner leg of the seal body with respect to the longitudinal axis of the substantially cylindrical portion of the second component, and wherein the first sealing portion and the second sealing portion define opposing boundary walls of the receiving space separated from one another in a radial direction by the receiving space,
wherein at least one claw element comprises at least one projection arranged on the base body of the spring element; and
at least partially introducing the spring element into the receiving space of the seal body, such that the at least one projection of the at least one claw element digs into a surface of a boundary wall of the receiving space in order to interlock the spring element with the seal body.

2. A method for producing a seal for sealing a sealing gap between a first component and a second component, comprising the following:
producing a seal body with at least one sealing portion and a receiving space;
producing a spring element with at least one claw element, wherein the spring element comprises a base body, which is meandering in shape, said base body, when viewed in a substantially unbent form, comprising a plurality of outer peripheral direction portions and a plurality of inner peripheral direction portions, wherein the inner and outer peripheral direction portions are arranged in an alternating manner and subsequent inner and outer peripheral direction portions are connected to one another by connecting web members oriented substantially radially from a center;
wherein the at least one claw element, when viewing the spring element in a substantially unbent form, is positioned on an outer peripheral direction portion that is a first distance from the center in the radial direction and an outer peripheral direction portion adjacent to the claw element is positioned at a second distance from the center in the radial direction, the first distance being shorter than the second distance;
wherein the seal body comprises a first sealing portion for applying against the first component and a second sealing portion for applying against the second component, wherein the spring element, when the seal is in the assembled state, biases the first sealing portion against the first component and the second sealing portion against the second component;
wherein the second component has a portion which is substantially cylindrical and has a longitudinal axis, the first sealing portion forming a radially outer leg of the seal body and the second sealing portion forming a radially inner leg of the seal body with respect to the longitudinal axis of the substantially cylindrical portion of the second component, and wherein the first sealing portion and the second sealing portion define opposing boundary walls of the receiving space separated from one another in a radial direction by the receiving space,
wherein at least one claw element comprises at least one projection arranged on the base body of the spring element; and
at least partially introducing the spring element into the receiving space of the seal body.

3. A seal for sealing a sealing gap between a first component and a second component, comprising:
a seal body with at least one sealing portion; and
at least one spring element for biasing the sealing portion against at least one of the components to be sealed,
wherein the spring element is at least partially arranged in a receiving space of the seal body,
wherein the spring element has at least one claw element, by means of which the spring element is interlocked with the seal body,
wherein the spring element comprises a base body, which is meandering in shape, said base body, when viewed in a substantially unbent form, comprising a plurality of outer peripheral direction portions and a plurality of inner peripheral direction portions, wherein the inner and outer peripheral direction portions are arranged in an alternating manner and subsequent inner and outer peripheral direction portions are connected to one another by connecting web members oriented substantially radially from a center,
wherein at least one claw element comprises at least one projection arranged on the base body of the spring element,
wherein the seal body comprises a first sealing portion for applying against the first component and a second sealing portion for applying against the second component, wherein the spring element, when the seal is in the assembled state, biases the first sealing portion against the first component and the second sealing portion against the second component;
wherein the second component has a portion which is substantially cylindrical and has a longitudinal axis, the first sealing portion forming a radially outer leg of the seal body and the second sealing portion forming a radially inner leg of the seal body with respect to the longitudinal axis of the substantially cylindrical portion of the second component, and wherein the first sealing portion and the second sealing portion define opposing boundary walls of the receiving space separated from one another in a radial direction by the receiving space, wherein the at least one projection of the at least one claw element digs into a surface of a boundary wall of the receiving space in order to interlock the spring element with the seal body, and wherein the seal body has no retaining projection to retain the spring element in the receiving space.

4. The seal according to claim 3, wherein the seal body is annular and wherein at least one claw element is arranged on a peripheral direction portion of a base body of the spring element, which extends substantially along the peripheral direction of the seal body.

5. The seal according to claim 3, wherein the receiving space of the seal body opens at a mouth opening into an external space of the seal body.

6. The seal according to claim 5, wherein the spring element has at least two claw elements, which are arranged at substantially the same spacing from the mouth opening of the receiving space.

7. The seal according to claim 5, wherein the spring element has at least two claw elements, which are arranged at different spacings from the mouth opening of the receiving space.

8. The seal according to claim 3, wherein the spring element has at least one claw element, which is interlocked with the first sealing portion, and has at least one claw element, which is interlocked with the second sealing portion.

9. The seal according to claim 3, wherein the spring element has at least two claw elements, which are interlocked with the same one of the two sealing portions.

10. The seal according to claim 3, wherein the spring element has at least one claw element, which is interlocked with the seal body at a boundary wall of the receiving space.

11. The seal according to claim 3, wherein the spring element has at least one claw element, which is interlocked with the seal body outside the receiving space.

12. The seal according to claim 11, wherein the seal body has an end face arranged next to the receiving space, at least one claw element being interlocked with the seal body at this end face.

13. The seal according to claim 3, wherein the seal body comprises a polytetrafluoroethylene material, a polytetrafluoroethylene compound, a modified polytetrafluoroethylene material and/or a modified polytetrafluoroethylene compound.

14. The seal according to claim 3, wherein the seal body comprises a melt-processable tetrafluoroethylene copolymer or a compound of a melt-processable tetrafluoroethylene copolymer.

15. The seal according to claim 3, wherein the seal body comprises at least two sealing portions spaced apart from one another in an axial direction of the seal body.

16. The seal according to claim 3, wherein the connecting web members are bent about a crest line such that a plurality of the outer peripheral direction portions and the inner peripheral direction portions are oriented substantially parallel to an axial direction of the spring element, which, when the seal is in the assembled state, coincides with an axial direction of the seal, or are inclined at a relatively small acute angle relative to the axial direction; and wherein the outer peripheral direction portions on which a claw element is arranged are inclined at a relatively larger acute angle α relative to the axial direction.

17. The seal according to claim 16, wherein the relatively larger acute angle α is in the range of about 20° to about 40°.

18. The seal according to claim 3, wherein the at least one claw element, when viewing the spring element in a substantially unbent form, is positioned on an outer peripheral direction portion that is a first distance from the center in the radial direction and an outer peripheral direction portion adjacent to the claw element is positioned at a second distance from the center in the radial direction, the first distance being shorter than the second distance.

19. The seal according to claim 3, wherein the seal body has a substantially U-shaped radial cross-section.

20. The seal according to claim 3, wherein an end of the first sealing portion is connected to an end of the second sealing portion by an annular web.

21. The seal according to claim 3, wherein the spring element has a substantially U-shaped radial cross-section.

22. A seal for sealing a sealing gap between a first component and a second component, comprising:

a seal body with at least one sealing portion; and at least one spring element for biasing the sealing portion against at least one of the components to be sealed, wherein the spring element is at least partially arranged in a receiving space of the seal body, wherein the spring element has at least one claw element, by means of which the spring element is interlocked with the seal body, wherein the spring element comprises a base body, which is meandering in shape, said base body, when viewed in a substantially unbent form, comprising a plurality of outer peripheral direction portions and a plurality of inner peripheral direction portions, wherein the inner and outer peripheral direction portions are arranged in an alternating manner and subsequent inner and outer peripheral direction portions are connected to one another by connecting web members oriented substantially radially from a center, wherein at least one claw element comprises at least one projection arranged on the base body of the spring element, wherein the seal body comprises a first sealing portion for applying against the first component and a second sealing portion for applying against the second component, wherein the spring element, when the seal is in the assembled state, biases the first sealing portion against the first component and the second sealing portion against the second component;

wherein the second component has a portion which is substantially cylindrical and has a longitudinal axis, the first sealing portion forming a radially outer leg of the seal body and the second sealing portion forming a radially inner leg of the seal body with respect to the longitudinal axis of the substantially cylindrical portion of the second component, and wherein the first sealing portion and the second sealing portion define opposing boundary walls of the receiving space separated from one another in a radial direction by the receiving space, and wherein the at least one claw element, when viewing the spring element in a substantially unbent form, is positioned on an outer peripheral direction portion that is a first distance from the center in the radial direction and an outer peripheral direction portion adjacent to the claw element is positioned at a second distance from the center in the radial direction, the first distance being shorter than the second distance.

* * * * *

UNITED STATES PATENT AND TRADEMARK OFFICE
CERTIFICATE OF CORRECTION

PATENT NO. : 9,182,041 B2  
APPLICATION NO. : 13/585457  
DATED : November 10, 2015  
INVENTOR(S) : Daub et al.

Page 1 of 1

It is certified that error appears in the above-identified patent and that said Letters Patent is hereby corrected as shown below:

On The Title Page, Item (30) Foreign Priority Data

On Page 1, under the heading "Foreign Application Priority Data," the last digit of the foreign priority application number was omitted, it should appear as follows:

Foreign Application Priority Data

Aug. 15, 2011 (DE) .......... 10 2011 080 970.8

Signed and Sealed this  
Third Day of May, 2016

Michelle K. Lee  
*Director of the United States Patent and Trademark Office*